US010720676B2

(12) United States Patent
Kawai et al.

(10) Patent No.: US 10,720,676 B2
(45) Date of Patent: Jul. 21, 2020

(54) POWER STORAGE PACK HAVING FIRST AND SECOND POWER STORAGE PACKS CONNECTED IN PARALLEL

(71) Applicant: Murata Manufacturing Co., Ltd., Nagaokakyo-shi, Kyoto-fu (JP)

(72) Inventors: Toru Kawai, Nagaokakyo (JP); Gaku Kamitani, Nagaokakyo (JP); Masahiro Otsuka, Nagaokakyo (JP); Ryoji Yamato, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 142 days.

(21) Appl. No.: 15/924,994

(22) Filed: Mar. 19, 2018

(65) Prior Publication Data

US 2018/0212213 A1    Jul. 26, 2018

Related U.S. Application Data

(63) Continuation of application No. PCT/JP2016/078293, filed on Sep. 26, 2016.

(30) Foreign Application Priority Data

Sep. 29, 2015    (JP) ................... 2015-190930

(51) Int. Cl.
*H01M 10/44* (2006.01)
*H01M 10/0525* (2010.01)
(Continued)

(52) U.S. Cl.
CPC ....... *H01M 10/441* (2013.01); *H01M 2/1016* (2013.01); *H01M 2/1077* (2013.01);
(Continued)

(58) Field of Classification Search
None
See application file for complete search history.

(56) References Cited

U.S. PATENT DOCUMENTS

2003/0198866 A1    10/2003    Tanjou et al.
2011/0001352 A1*    1/2011    Tamura ............... B60R 16/033
                                                                            307/9.1
(Continued)

FOREIGN PATENT DOCUMENTS

CN    104319425 A    1/2015
EP    3223336 A1    9/2017
(Continued)

OTHER PUBLICATIONS

International Search Report issued in International Application No. PCT/JP2016/078293, dated Dec. 20, 2016.
(Continued)

*Primary Examiner* — Ula C Ruddock
*Assistant Examiner* — Tony S Chuo
(74) *Attorney, Agent, or Firm* — Arent Fox LLP

(57) ABSTRACT

A power storage pack having a charge/discharge curve with a step passing through the range of (12.5×n) V to (12.8×n) V, where n is a natural number of 1 to 125. The average discharge voltage on the lower SOC side of the start point of the step of the charge/discharge curve for the power storage pack fails within the range of (9.0×n) V to (12.5×n) V. The average charge voltage on the higher SOC side of the end point of the step of the charge/discharge curve for the power storage pack falls within the range of (12.8×n) V to (14.8×n) V.

8 Claims, 34 Drawing Sheets

(51) Int. Cl.
  *H01M 4/525* (2010.01)
  *H01M 4/505* (2010.01)
  *H01M 2/10* (2006.01)
  *H01M 4/131* (2010.01)
  *H01M 4/58* (2010.01)
  *H01M 4/36* (2006.01)
  *H02J 7/00* (2006.01)
  *H01M 16/00* (2006.01)
  *H01M 10/04* (2006.01)
  *H01M 10/058* (2010.01)
  *H01M 4/48* (2010.01)
  *H01M 10/34* (2006.01)
  *H01M 10/06* (2006.01)

(52) U.S. Cl.
  CPC ........... *H01M 4/131* (2013.01); *H01M 4/364* (2013.01); *H01M 4/48* (2013.01); *H01M 4/505* (2013.01); *H01M 4/525* (2013.01); *H01M 4/58* (2013.01); *H01M 4/5825* (2013.01); *H01M 10/04* (2013.01); *H01M 10/058* (2013.01); *H01M 10/0525* (2013.01); *H01M 10/44* (2013.01); *H01M 16/00* (2013.01); *H02J 7/00* (2013.01); *H01M 10/06* (2013.01); *H01M 10/345* (2013.01); *Y02E 60/122* (2013.01); *Y02T 10/7011* (2013.01)

(56) References Cited

U.S. PATENT DOCUMENTS

| | | |
|---|---|---|
| 2011/0086248 A1 | 4/2011 | Nakura |
| 2014/0138591 A1* | 5/2014 | Yoon .................. C01B 25/45 252/519.14 |
| 2017/0170669 A1 | 6/2017 | Wang et al. |

FOREIGN PATENT DOCUMENTS

| | | |
|---|---|---|
| JP | 2003308817 A | 10/2003 |
| JP | 2007131134 A | 5/2007 |
| JP | 2014143171 A | 8/2014 |
| WO | WO 2009147854 A1 | 12/2009 |
| WO | 2013016426 A1 | 1/2013 |

OTHER PUBLICATIONS

Written Opinion of the International Searching Authority issued in International Application No. PCT/JP2016/078293, dated Dec. 20, 2016.

* cited by examiner

POWER STORAGE PACK HAVING FIRST AND SECOND POWER STORAGE PACKS CONNECTED IN PARALLEL

CROSS REFERENCE TO RELATED APPLICATIONS

The present application is a continuation of International application No. PCT/JP2016/078293, filed Sep. 26, 2016, which claims priority to Japanese Patent Application No. 2015-190930, filed Sep. 29, 2015, the entire contents of each of which are incorporated herein by reference.

FIELD OF THE INVENTION

The present invention relates to a power storage pack.

BACKGROUND OF THE INVENTION

Lead storage batteries are widely used in various applications, such as in-car applications for driving automobiles or for use as power supply to various types of electric loads, industrial applications for use as backup power supplies for commercial power supplies, and electric vehicle applications for use as main power supplies for golf carts, forklifts, and the like. Lead storage batteries are commonly used, such as six batteries connected in series for 12 V, and batteries configured for 24 V, 36 V, 48 V, 60 V, 72 V, and the like as multiples of 12 V.

Lead storage batteries are low in price as compared with storage batteries such as lithium ion storage batteries and nickel-metal-hydride storage batteries, but inferior in charge/discharge cycle characteristics as compared with the storage batteries. In particular, lead storage batteries have charge/discharge cycle characteristics degraded significantly on reaching an overcharge state or an overdischarge state. For example, when a lead storage battery reaches an overcharge state, gas generation and a decrease in amount of electrolytic solution, corrosion of a current collector, and loss of an active material due to electrolysis of sulfuric acid as an electrolytic solution will be caused, thereby degrading charge/discharge cycle characteristics. Alternatively, when a lead storage battery reaches an overdischarge state, positive and negative electrode surfaces covered with a lead sulfate which is a reaction product and an insulator will inhibit smooth charge/discharge reactions, thus degrading charge/discharge cycle characteristics.

Therefore, in particular, when only a lead storage battery is used as a storage battery for an in-car application or an electric vehicle, there is concern about early deterioration of the lead storage battery. When this concern is addressed by simply replacing the lead storage battery with a storage battery which is superior in charge/discharge cycle characteristics to lead storage batteries such as lithium ion storage batteries and nickel-metal-hydride storage batteries, an increase in the price of the storage battery will be caused.

Therefore, Patent Document 1 proposes a power storage system where an inexpensive lead storage battery and a high-performance storage battery which is superior in charge/discharge cycle characteristics to the lead storage battery are connected in parallel.

Patent Document 1: Japanese Patent Application Laid-Open No. 2007-131134

SUMMARY OF THE INVENTION

In the above regard, not only the lead storage batteries described previously, but also power storage devices commonly undergo early deterioration on reaching an overcharge state or an overdischarge state. Therefore, it is desirable to use the power storage devices to the extent that a SOC (State of Charge: the proportion of a charging capacity to the amount of charge in a full charge state) that represents a state of charging a storage battery reaches no overcharge/overdischarge state (SOC range of use).

When the lead storage battery and the high-performance storage battery such as a lithium ion storage battery differ in open-circuit voltage, directly connecting both of power storage batteries in parallel leads to concern about electric current flowing into the storage battery on the lower open-circuit voltage side from the storage battery on the higher open-circuit voltage side, or on the other hand, reaching an overcharge/overdischarge state with both of the storage batteries outside the SOC range of use.

Therefore, in the power storage system described in Patent Document 1 mentioned above, a DCDC converter is provided between the lead storage battery and the high-performance storage battery. For this reason, the terminal voltage of the storage battery on the higher open-circuit voltage side is adjusted by the DCDC converter. Therefore, current is prevented from flowing into the storage battery on the lower open-circuit voltage side from the storage battery on the higher open-circuit voltage side. In addition, both of the storage batteries are prevented from reaching an overcharge/overdischarge state.

However, the DCDC converter is high in price and large in size, and the power storage system described in Patent Document 1, which is provided with the DCDC converter, is thus high in price and large in size.

A main object of the present invention is to achieve an increase in the life-span of a power storage system, a reduction in the price thereof, and a reduction in the size thereof.

The charge/discharge curve for a power storage pack according to the present invention has a step passing through the range of $(12.5 \times n)$ V to $(12.8 \times n)$ V (n is a natural number of 1 to 125). The average discharge voltage on the lower SOC side of the start point of the step of the charge/discharge curve for the power storage pack according to the present invention falls within the range of $(9.0 \times n)$ V to $(12.5 \times n)$ V. The average charge voltage on the higher SOC side of the end point of the step of the charge/discharge curve for the power storage pack according to the present invention balls within the range of $(12.8 \times n)$ V to $(14.8 \times n)$ V.

It is possible to use, as a power storage system, the power storage pack according to the present invention, connected in parallel to a power storage pack with $6 \times n$ lead storage batteries connected in series. The power storage pack with the $6 \times n$ lead storage batteries connected in series represents a lead storage battery pack configured for a multiple of 1.2 V In the case of n=1, the power storage pack with the $6 \times n$ lead storage batteries connected in series represents a lead storage battery pack configured for 12 V with six lead storage batteries connected in series. In the case of n=2, the power storage pack with the $6 \times n$ lead storage batteries connected in series represents a lead storage battery pack configured for 24 V with twelve lead storage batteries connected in series, or a lead storage battery pack configured for 24 V with two series-connected lead storage batteries each configured for 12 V The same applies to cases with n of 3 or more.

The power storage pack according to the present invention has a step passing through the range of $(12.5 \times n)$ V to $(12.8 \times n)$ V (n is a natural number of 1 to 125). For this reason, for example, in a power storage system in which a power storage pack with 6×n lead storage batteries connected in series is connected in parallel to the power storage pack according to the present invention, when the voltage of the lead storage battery pack falls within the voltage range in normal use, the voltage of the power storage pack according to the present invention substantially coincides with the voltage of the lead storage battery pack at the step of the charge/discharge curve for the power storage pack according to the present invention. The generation of a large voltage difference is eliminated between the power storage pack according to the present invention and the lead storage battery pack. Therefore, there is not always a need to provide a DCDC converter between the power storage pack according to the present invention and the lead storage battery pack. Accordingly, for example, the use of the power storage pack according to the present invention makes it possible to reduce the price of a power storage system including the lead storage battery pack, and reduce the size thereof.

The average discharge voltage on the lower SOC side of the start point of the step of the charge discharge curve for the power storage pack according to the present invention falls within the range of (9.0×n) V to (12.5×n) V. For this reason, when the power storage system with the parallel-connected power storage packs each with the 6×n lead storage batteries connected in series is required for large current output, the output from the power storage packs according to the present invention is also provided in a condition in which the voltage of the lead storage battery pack is lower than the voltage range in normal use, thereby making it possible to prevent the voltage of the lead storage battery pack from being lower than the discharge cutoff voltage. Therefore, deterioration due to an overdischarge state of the lead storage battery pack can be prevented, thereby allowing an increase in the life-span of the power storage system. In addition, there is no need for a special circuit for preventing an overdischarge state of the lead storage battery pack, thus allowing a reduction in the price of the power storage system.

The average charge voltage on the higher SOC side of the end point of the step of the charge/discharge curve for the power storage pack according to the present invention fails within the range of (12.8×n) V to (14.8×n) V. For this reason, when the power storage system with the parallel-connected power storage packs each with the 6×n lead storage batteries connected in series is required for large current input, the input to the power storage packs according to the present invention is also provided in a condition in which the voltage of the lead storage battery pack is higher than the voltage range in normal use, thereby making it possible to prevent the voltage of the lead storage battery pack from being higher than the charge cutoff voltage. Therefore, deterioration due to an overcharge state of the lead storage battery pack can be prevented, thereby allowing an increase in the life-span of the power storage system. In addition, there is no need for a special circuit for preventing an overcharge state of the lead storage battery pack, thus allowing a reduction in the price of the power storage system.

The charge/discharge curve for a power storage pack according to the present invention has a step passing through the range of (12.5×n) V to (12.8×n) (n is a natural number of 1 to 125). On the lower SOC side of the start point of the step of the charge/discharge curve for the power storage pack according to the present invention, the voltage at the peak top obtained on the curve (dQ/dV curve) obtained by differentiating, with respect to voltage, the discharge curve for the power storage pack falls within the range of (9.0×n) V to (12.5×n) V. On the higher SOC side of the end point of the step of the charge/discharge curve for the power storage pack according to the present invention, the voltage at the peak top obtained on the curve (dQ/dV curve) obtained by differentiating, with respect to voltage, the charge curve for the power storage pack hills within the range of (12.8×n) V to (14.8×n) V.

It is possible to use, as a power storage system, the power storage pack according to the present invention, connected in parallel to a power storage pack with 6×n lead storage batteries connected in series.

The power storage pack according to the present invention has a step passing through the range of (12.5×n) V to (12.8×n) V (a is a natural number of 1 to 125). For this reason, for example, in a power storage system in which a power storage pack with 6×n lead storage batteries connected in series is connected in parallel to the power storage pack according to the present invention, when the voltage of the lead storage battery pack falls within the voltage range in normal use, the voltage of the power storage pack according to the present invention substantially coincides with the voltage of the lead storage battery pack at the step of the charge/discharge curve for the power storage pack according to the present invention. The generation of a large voltage difference is eliminated between the power storage pack according to the present invention and the lead storage battery pack. Therefore, there is not always a need to provide a DCDC converter between the power storage pack according to the present invention and the lead storage battery pack. Accordingly, for example, the use of the power storage pack according to the present invention makes it possible to reduce the price of a power storage system including the lead storage battery pack, and reduce the size thereof.

On the lower SOC side of the start point of the step of the charge/discharge curve for the power storage pack according to the present invention, the voltage at the peak top obtained on the curve (dQ/dV curve) obtained by differentiating, with respect to voltage, the discharge curve for the power storage pack falls within the range of (9.0×n) V to (12.5×n) V. For this reason, when the power storage system with the parallel-connected power storage packs each with the 6×n lead storage batteries connected in series is required for large current output, the output from the power storage packs according to the present invention is also provided in a condition in which the voltage of the lead storage battery pack is lower than the voltage range in normal use, thereby making it possible to prevent the voltage of the lead storage battery pack from being lower than the discharge cutoff voltage. Therefore, deterioration due to an overdischarge state of the lead storage battery pack can be prevented, thereby allowing an increase in the life-span of the power storage system. In addition, there is no need for a special circuit for preventing an overdischarge state of the lead storage battery pack, thus allowing a reduction in the price of the power storage system.

On the higher SOC side of the end point of the step of the charge/discharge curve for the power storage pack according to the present invention, the voltage at the peak top obtained on the curve (dQ/dV curve) obtained by differentiating, with respect to voltage, the charge curve for the power storage pack fails within the range of (12.8×n) V to (14.8×n) V. For this reason, when the power storage system with the parallel-connected power storage packs each with the 6×n lead storage batteries connected in series is required for large current input, the input to the power storage packs according to the present invention is also provided in a condition in which the voltage of the lead storage battery pack is higher than the voltage range in normal use, thereby making it possible to prevent the voltage of the lead storage battery pack from being higher than the charge cutoff voltage. Therefore, deterioration due to an overcharge state of the lead storage battery pack can be prevented, thereby allowing an increase in the life-span of the power storage system. In addition, there is no need for a special circuit for preventing an overcharge state of the lead storage battery pack, thus allowing a reduction in the price of the power storage system.

The power storage pack according to the present invention may include a power storage device, and the power storage device may be a lithium ion storage battery or a nickel-metal-hydride storage battery.

The power storage pack according to the present invention may include a lithium ion storage battery, and the lithium ion storage battery may have a positive electrode including at least one selected from the group consisting of Li[Ni$_x$Mn$_{(2-x)}$]O$_4$ (0.05≤x≤0.45), Li[Co$_x$Mn$_{(2-x)}$]O$_4$ (0.1≤x≤1), Li[Fe$_x$Mn$_{(2-x)}$]O$_4$ (0.05≤x≤0.45), LiFe$_a$Mn$_b$Co$_c$Ni$_d$PO$_4$ (0≤a≤1, 0≤b≤1, 0≤c≤1, 0≤d≤1, a+b+c+d=1), and Li$_3$V$_2$(PO$_4$)$_3$ as a positive electrode active material.

The power storage pack according to the present invention may include a lithium ion storage battery, and the lithium ion storage battery may have a positive electrode including multiple kinds of positive electrode active materials.

The power storage pack according to the present invention may include a lithium ion storage battery, and the lithium ion storage battery may have a negative electrode including multiple kinds of negative electrode active materials.

The power storage pack according to the present invention may be composed of a plurality of power storage modules connected in parallel, which is composed of a plurality of power storage devices connected in series, and the plurality of power storage modules may include power storage modules that differ from each other in number of connection stages. The power storage pack according to the present invention may include multiple types of power storage modules that have different types of power storage devices.

The ratio preferably falls within the range of 10:90 to 90:10 between the capacity on the lower SOC side of the start point of a step of the charge/discharge curve for each of first and second power storage packs according to the present invention and the capacity on the higher SOC side of the end point of the step of the charge discharge curve for the second power storage pack.

According to the present invention, an increase in the life-span of a power storage system, a reduction in the price thereof, and a reduction in the size thereof can be achieved.

DETAILED DESCRIPTION OF THE INVENTION

An example of a preferred embodiment of the present invention will be described below. However, the following embodiment is considered by way of example only. The present invention is not limited to the following embodiment in any way. In addition, members that have substantially the same functions shall be denoted by the same reference symbols in the respective drawings referred to in the embodiment and the like.

Figure 1:
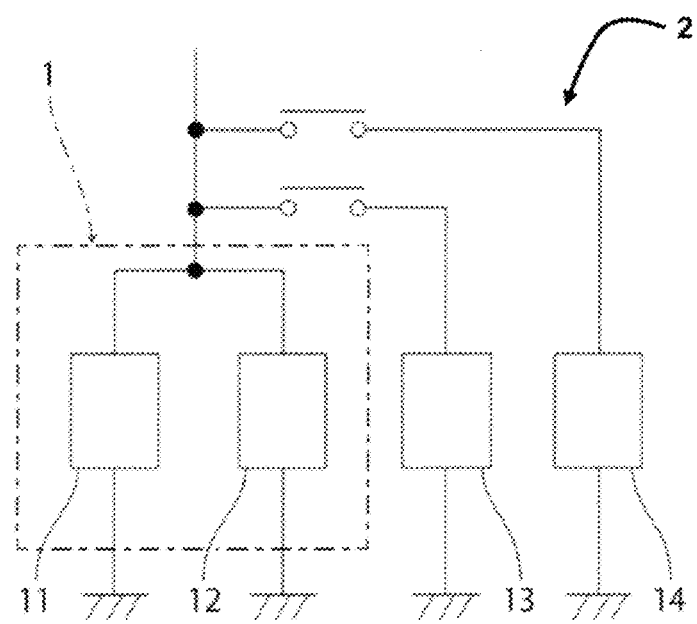
FIG. 1 is a schematic circuit diagram of a vehicle according to an embodiment of the present invention.

FIG. 1 is a schematic circuit diagram of a vehicle according to the present embodiment.

The vehicle 2 shown in FIG. 1 includes a power storage system 1. An example of using the power storage system 1 for the vehicle 2 will be described in the present embodiment, hut the application of the power storage system 1 is not limited thereto. The power storage system 1 is used in a preferred manner, for example, for a power supply of a vehicle such as an automobile, a golf cart, a forklift, a rail vehicle, or an airplane, a transfer means such as a ship, or a transport means. For example, the power storage system 1 is also used in a preferred manner as a power supply for an idling stop mechanism of an automobile that has the idling stop mechanism. The power storage system 1 is preferred for, in particular, electric vehicles such as a golf cart, a forklift, an electric wheelchair, a walker for an aged person, an electric scooter, an electric bicycle, an electric cart, an electric car, a Low Speed Vehicle (LSV), and an automated guided vehicle (AGV), which include a lead storage battery as a main power supply, and automobiles that have an idling stop function. It is to be noted that while FIG. 1 is a schematic conceptual diagram of a vehicle, the system in FIG. 1 is also used as well for a transfer mechanism and a transport mechanism.

In addition, the power storage system 1 is also preferred in power storage applications for power generators such as wind power generators, solar power generators, fuel cells, diesel generators, gasoline generators, and gas power generators.

The power storage system 1 includes a first power storage pack 11 and a second power storage pack 12. The first power storage pack 11 is a lead storage battery pack.

An example in which the first power storage pack 11 is a power storage pack with 6×n (a is a natural number of 1 to 125) lead storage batteries connected in series will be described below in the present embodiment. In this case, the voltage range in normal use of the first power storage pack 11 is approximately (12.5×n) V to (12.8×n) V. The discharge cutoff voltage of the first power storage pack 11 is approximately (9.0×n) V. The charge cutoff voltage of the first power storage pack 11 is approximately (14.8×n) V.

The second power storage pack 12 is connected in parallel to the first power storage pack 11. Specifically, the first power storage pack 11 and the second power storage pack are connected in parallel without any DCDC converter interposed therebetween.

The second power storage pack 12 can be composed of, for example, a power storage pack such as a lithium ion storage battery pack and a nickel-metal-hydride storage battery pack. In addition, the second power storage pack 12 can be also composed of a capacitor such as a lithium ion capacitor (LIC) or an electric double layer capacitor (EDLC).

It is to be noted that in the present invention the "power storage device" means a storage battery such as a lead storage battery, a lithium ion storage battery, and a nickel-metal-hydride storage battery, and a unit cell such as a capacitor.

In the present invention, the "power storage pack" includes at least one power storage device. Among power storage packs, a pack composed of at least one storage battery is referred to as a "storage battery pack". Accordingly, the lithium ion storage battery pack means a storage battery pack composed of at least one lithium ion storage battery. The lead storage battery pack means a storage battery pack composed of at least one lead storage battery. The nickel-metal-hydride storage battery pack means a storage battery pack composed of at least one nickel-metal-hydride storage battery.

The power storage pack may be composed of one power storage module. The power storage pack may be composed of a plurality of power storage modules connected in parallel. The power storage pack may have a power storage module connected in parallel to at least one of a plurality of power storage modules connected in series.

In the present invention, the "power storage module" means at least one power storage device connected in series. Accordingly, the power storage pack can have a power storage module.

According to the present invention, when a power storage pack has a plurality of power storage devices, the plurality of power storage devices may have the same type of devices, or include multiple types of power storage devices.

Figure 2:
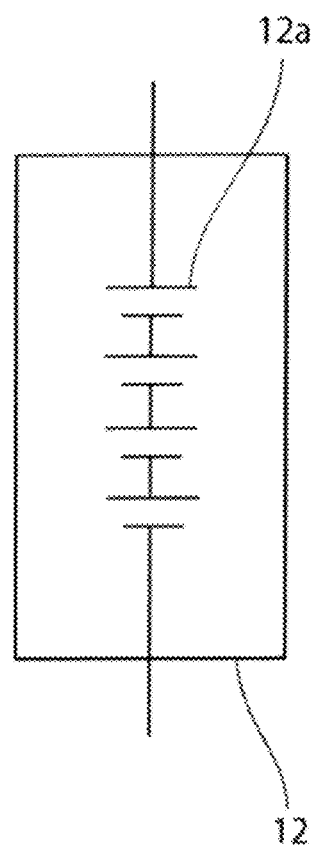
FIG. 2 is a schematic circuit diagram of a second power storage pack according to an embodiment of the present invention.

As shown in FIG. 2, an example of the second power storage pack 12 with a plurality of power storage devices 12a connected in series will be described in the present embodiment. Specifically, an example of the second power storage pack 12 composed of four lithium ion storage batteries 12a connected in series will be described in the present embodiment.

Figure 3:
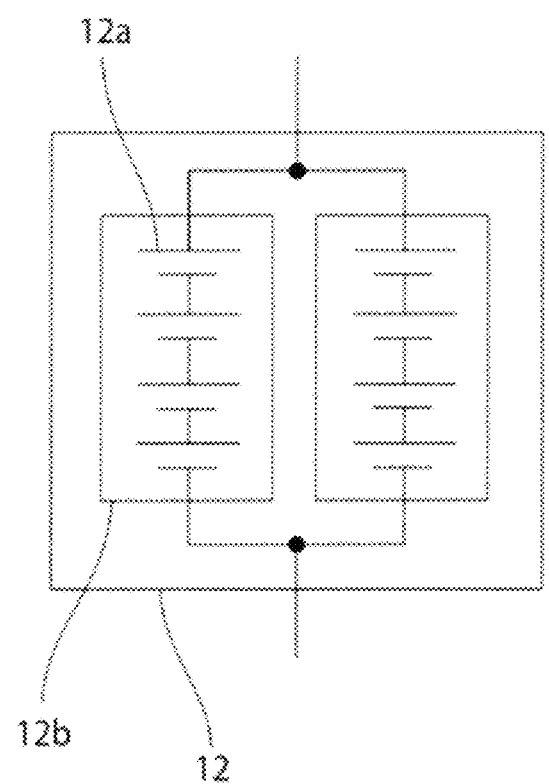
FIG. 3 is a schematic circuit diagram of a second power storage pack according to a first modification example.
Figure 4:
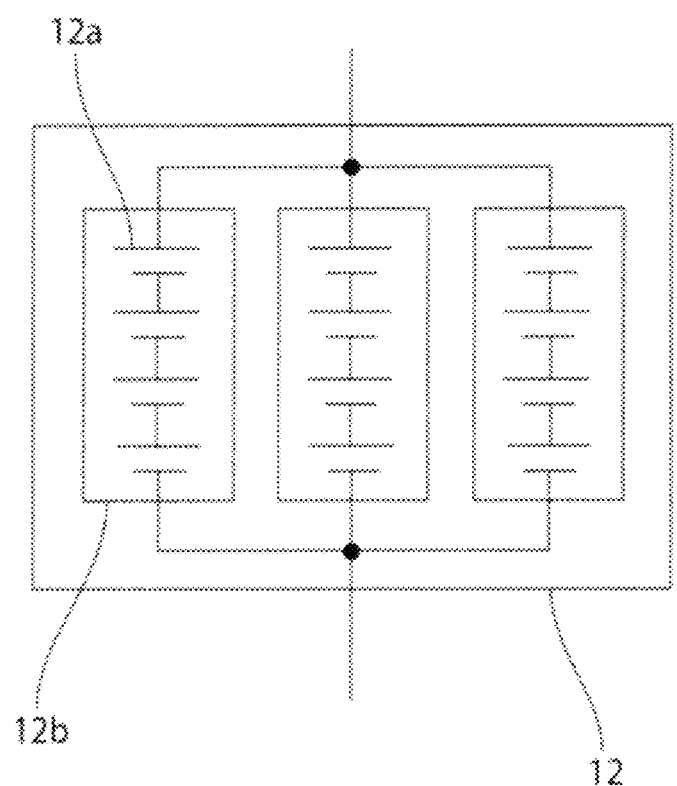
FIG. 4 is a schematic circuit diagram of a second power storage pack according to a second modification example.
Figure 5:
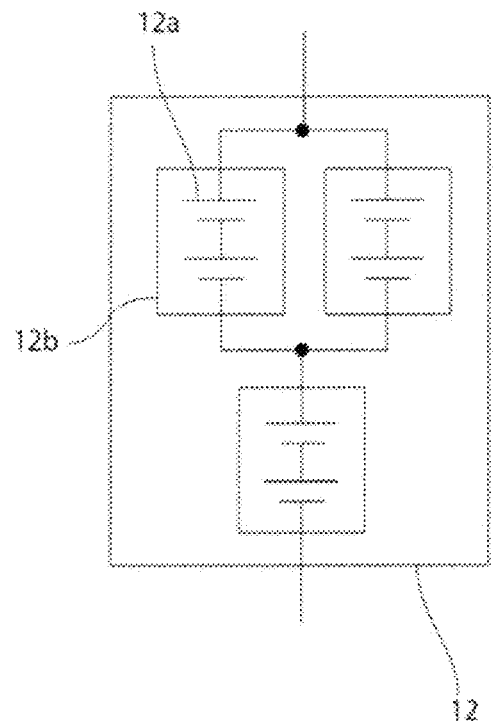
FIG. 5 is a schematic circuit diagram of a second power storage pack according to a third modification example.

According to the present invention, the second power storage pack is not necessarily required to be composed of one power storage module. For example, as shown in FIGS. 3 and 4, a plurality of power storage modules 12b may be connected in parallel in the second power storage pack 12. For example, as shown in FIG. 5, a power storage module may be connected in parallel to at least one of a plurality of power storage modules 12b connected in series in the second power storage pack 12.

It is to be noted that each of the first and second power storage packs 11, 12 may further have a control unit for controlling a battery constituting each of the packs 11, 12.

When the second power storage pack 12 is a lithium ion storage battery pack, examples of a positive electrode active material included in a positive electrode of the lithium ion storage battery include inorganic compounds such as a composite oxide of a transition metal and lithium, a transition metal oxide, and a transition metal sulfide, and organic compounds. Specifically, the examples include composite oxides of transition metals and lithium, such as $LiCoO_2$, $LiNiO_2$, $LiMnO_2$, $LiMn_2O_4$, $Li_{(1+a)}Ni_xMn_yCo_zO_2$ ($0 \leq a \leq 0.5$, $0 \leq x \leq 1$, $0 \leq y \leq 1$, $0 \leq z \leq 1$, $x+y+z=1$), $Li[Ni_xMn_{(2-x)}]O_4$ ($0 \leq x \leq 0.5$), $Li[Co_xMn_{(2-x)}]O_4$ ($0 \leq x \leq 1$), $Li[Fe_xMn_{(2-x)}]O_4$ ($0 \leq x \leq 1$), $LiNiVO_4$, $LiFePO_4$, $LiMnPO_4$, $LiCoPO_4$, $LiNiPO_4$, $LiFe_aMn_bCo_cNi_dPO_4$ ($0 \leq a \leq 1$, $0 \leq b \leq 1$, $0 \leq c \leq 1$, $0 \leq d \leq 1$, $a+b+c+d=1$), $Li_3V_2(PO_4)_3$, and $LiVOPO_4$; transition metal oxides such as $MnO_2$, $MnO$, and $V_2O_5$; transition metal sulfides such as FeS and TiS; and organic compounds such as quinone compounds, disulfide compounds, diazine compounds, radialene compounds, rubeanic acid compounds, and organic radical compounds. The above-mentioned compounds with transition metal elements substituted with different types of elements may be used for the inorganic compounds. One of these positive electrode active materials may be used alone, or two or more thereof may be used concurrently.

Examples of a negative electrode active material included in a negative electrode of the lithium ion storage battery include inorganic compounds such as a composite oxide of a transition metal and lithium, a metal oxide, an alloy material, and a transition metal sulfide, carbon materials, organic compounds, and lithium metals. Specifically, the examples include composite oxides of transition metals and lithium, such as $LiMnO_2O_4$, $Li_4Ti_5O_{12}$, $Li_2Ti_3O_7$, $LiMg_{1/2}Ti_{3/2}O_4$, $LiCo_{1/2}Ti_{3/2}O_4$, $LiZn_{1/2}Ti_{3/2}O_4$, $LiFeTiO_4$, $LiCrTiO_4$, $Li_2SrTi_6O_{14}$, and $Li_2BaTi_6O_{14}$; metal oxides such as $TiO_2$, $WO_3$, $MoO_2$, $MnO_2$, $V_2O_5$, $SiO_2$, $SiO$, and $SnO_2$; alloy materials of Si, Sn, or the like; transition metal sulfides such as FeS and TiS; carbon materials such as graphite, non-graphitizable carbon, and graphitizable, carbon; and organic compounds such as quinone compounds, disulfide compounds, diazine compounds, radialene compounds, rubeanic acid compounds, and organic radical compounds. The above-mentioned compounds with transition metal elements substituted with different types of elements may be used for the inorganic compounds. One of these negative electrode active materials may be used alone, or two or more thereof may be used concurrently. In addition, the above-mentioned negative electrode active materials subjected to pre-doping treatment with lithium ions may be used for the negative electrode active material.

According to the present embodiment, an electric load 13 composed of a motor or the like and a recharger 14 are connected in parallel to the power storage system 1. Between the power storage system 1 and each of the electric load 13 and the recharger 14, a switch is provided.

Further, in order to enhance the safety of the power storage system 1, a fuse or an FET switch may be provided between the first power storage pack 11 and the second power storage pack 12, if necessary.

The electric power supplied from the recharger 14 is supplied to the first power storage pack 11 and the second power storage pack 12. When the electric load 13 is operated without connecting the recharger 14, electric power is supplied from the first power storage pack 11 and the second power storage pack 12 to the electric load 13. The first power storage pack 11 and the second power storage pack 12 are provided with a control device, if necessary, to be controlled such that no abnormality occurs, such as an overcharges/overdischarge state or overheat.

According to the present embodiment, the electric load 13 is specifically an electric motor, and during deceleration of the vehicle 2, decelerating regeneration is carried out in which regenerative energy is converted to electrical energy by the electric motor as the electric load 13 to charge the first power storage pack 11 and the second power storage pack 12.

The power storage system 1 satisfies the following conditions (a), (b), and (c).

(a) The charge/discharge curve for the second power storage pack 12 has a step passing through the range of $(12.5 \times n)$ V to $(12.8 \times n)$ V (n is a natural number of 1 to 125).

(b) The average discharge voltage on the lower SOC side of the start point of the step of the charge/discharge curve for the second power storage pack 12 falls within the range of $(9.0 \times n)$ V to $(12.5 \times n)$ V.

(c) The average charge voltage on the higher SOC side of the end point of the step of the charge/discharge curve for the second power storage pack 12 falls within, the range of $(12.8 \times n)$ V to $(14.8 \times n)$ V.

Furthermore, the power storage system 1 satisfies the following conditions (d) and (e).

(d) On the lower SOC side of the start point of the step of the charge/discharge curve for the second power storage pack 12, the voltage at the peak top obtained on the curve (dQ/dV curve) obtained by differentiating, with respect to voltage, the discharge curve for the second power storage pack falls within the range of $(9.0 \times n)$ V to $(12.5 \times n)$ V.

(e) On the higher SOC side of the end point of the step of the charge discharge curve for the second power storage pack 12, the voltage at the peak top obtained on the curve (dQ/dV curve) obtained by differentiating, with respect to voltage, the charge curve for the second power storage pack falls within the range of $(12.8 \times n)$ V to $(14.8 \times n)$ V.

In the present invention, "the step of a charge/discharge curve" refers to a range in which the voltage varies significantly in the range of 5% to 95% in the SOC of the second power storage pack 12, and specifically, refers to a range in which the absolute value of $\Delta V / \Delta SOC$ that is the proportion of the amount of change in voltage ($\Delta V$) on at least one of the charge curve or the discharge curve to the amount of change in SOC ($\Delta SOC$) is $(100 \times n)$ mV/% or more in the range of 5% to 95% in the SOC.

"The start point of a step" means the minimum voltage of a discharge curve in the range of one step, and the SOC at the voltage.

"The end point of the step" means the maximum voltage of a charge curve in the range of the same step, and the SOC at the voltage.

The charge/discharge curve for the second power storage pack 12 refers to a charge discharge curve in the case of constant-current charging/discharging in the voltage range from a discharge cutoff voltage to a charge cutoff voltage at a current value of 0.2 C under the condition of 2.5° C.±5° C. The "current value of 1 C" refers to a current value for charging or discharging to a rating capacity for 1 hour. In addition, the dQ/dV curve for the second power storage pack 12 refers to a curve (dQ/dV curve) obtained by differentiating the charge/discharge curve for the second power storage pack 12 with respect to voltage.

It is to be noted that the second power storage pack 12 according to the present embodiment satisfies all of the conditions (a), (b), (c), (d), and (e), but there is no need to limit the present invention thereto. The second power storage pack according to the present invention may satisfy only the conditions (a), (b), and (c). Alternatively, the second power storage pack according to the present invention may satisfy only the conditions (a), (d), and (e).

The power storage system 1 according to the present embodiment satisfies the condition (a). For this reason, when the voltage of the first power storage pack 11 falls within the voltage range in normal use, the voltage of the second power storage pack 12 substantially coincides with the voltage of the first power storage pack 11 at the step of the charge/discharge curve for the second power storage pack 12, and the generation of a large voltage difference is eliminated between the second power storage pack 12 and the first power storage pack 11. Therefore, there is not always a need to provide a DCDC converter between the second power storage pack 12 and the first power storage pack 11. Accordingly, it becomes possible to reduce the price of the power storage system 1 and reduce the size thereof.

The power storage system 1 satisfies at least one of the condition (b) and the condition (d). For this reason, when the second power storage pack 12 is required for large current output, the output from the second power storage pack 12 is also provided in a condition in which the voltage of the first power storage pack 11 is lower than the voltage range in normal use. Therefore, the voltage of the first power storage pack 11 can be prevented from being lower than the discharge cutoff voltage. Consequently, deterioration due to an overdischarge state of the first power storage pack 11 can be prevented, thereby allowing an increase in the life-span of the power storage system 1. In addition, there is not always a need for a special circuit for preventing an overdischarge state of the first power storage pack 11, thus allowing a reduction in the price of the power storage system 1.

The power storage system satisfies at least one of the condition (c) and the condition (e). For this reason, when the power storage system 1 is required for large current input, the input to the second power storage pack 12 is also provided in a condition in which the voltage of the first power storage pack 11 is higher than the voltage range in normal use. Consequently, the voltage of the first power storage pack 11 can be prevented from being higher than the charge cutoff voltage. Therefore, deterioration due to an overcharge state of the first power storage pack 11 can be prevented, thereby allowing an increase in the life-span of the power storage system 1. In addition, there is no need for a special circuit for preventing an overcharge state of the first power storage pack 11, thus allowing a reduction in the price of the power storage system 1.

The following methods are conceivable as a method for configuring the power storage system 1 to satisfy the conditions (a), (b), (c), (d), and (e).

(Method 1)

A method of adopting, as the second power storage pack 12, a lithium ion storage battery pack including a lithium ion storage battery, and using a positive electrode active material that causes a charge/discharge curve for the lithium ion storage battery to have a step, as a positive electrode active material for a positive electrode of the lithium ion storage battery. Alternatively, a method of using a negative electrode active material that causes a charge/discharge curve for the lithium ion storage battery to have a step, as a negative electrode active material for a negative electrode of the lithium ion storage battery.

Specific examples of the positive electrode active material that causes a charge/discharge curve for the lithium ion storage battery to have a step include, for example, $Li[Ni_xMn_{(2-x)}]O_4$ ($0.05 \leq x \leq 0.45$), $Li[Co_xMn_{(2-x)}]O_4$ ($0.1 \leq x \leq 1$), $Li[Fe_xMn_{(2-x)}]O_4$ ($0.05 \leq x \leq 0.45$), $LiFe_aMn_bCo_cNi_dPO_4$ ($0 \leq a \leq 1$, $0 \leq b \leq 1$, $0 \leq c \leq 1$, $0 \leq d \leq 1$, $a+b+c+d=1$), and $Li_3V_2(PO_4)_3$. Only one of these positive electrode active materials may be used, or two or more thereof may be used in mixture.

Specific examples of the negative electrode active material that causes a charge discharge curve for the lithium ion storage battery to have a step include, for example, $LiMn_2O_4$, $Li_4Ti_5O_{12}$, $LiMg_{1/2}Ti_{3/2}O_4$, $LiCo_{1/2}Ti_{3/2}O_4$, $LiZn_{1/2}Ti_{3/2}O_d$, $LiFeTiO_4$, $LiCrTiO_4$, $Li_2SrTi_6O_{14}$, $Li_2BiTi_6O_{14}$, $TiO_2$, $WO_3$, $MoO_2$, and $MnO_2$. Only one of these negative electrode active materials may be used, or two or more thereof may be used in mixture.

(Method 2)

A method of adopting, as the second power storage pack 12, a lithium ion storage battery pack including a lithium ion storage battery, and causing a positive electrode of the lithium ion storage battery to include multiple types of positive electrode active materials.

For example, it is conceivable that the positive electrode of the lithium ion storage battery is adapted to include the positive electrode active materials below.

1) $LiFePO_4$ and $LiCoO_2$
2) $LiFePO_4$ and $LiMn_2O_4$
3) $LiFePO_4$ and $Li_{(1+a)}Ni_xMn_yCo_zO_2$ ($0 \leq a \leq 0.5$, $0 \leq x \leq 1$, $0 \leq y \leq 1$, $0 \leq z \leq 1$, $x+y+z=1$)
4) $LiFePO_4$ and $Li[Ni_xMn_{(2-x)}]O_4$ ($0 \leq x \leq 0.5$)
5) $LiFePO_4$ and $LiMnPO_4$
6) $LiFePO_4$ and $LiCoPO_4$
7) $LiMn_2O_4$ and $Li[Ni_xMn_{(2-x)}]O_4$ ($0 \leq x \leq 0.5$)
8) $LiMn_2O_4$ and $LiCoPO_4$ (Method 3)

A method of adopting, as the second power storage pack 12, a lithium ion storage battery pack including a lithium ion storage battery, and causing a negative electrode of the lithium ion storage battery to include multiple types of negative electrode active materials.

For example, it is conceivable that the negative electrode of the lithium ion storage battery is adapted to include the negative electrode active materials below.

1) graphite and $Li_4Ti_5O_{12}$
2) graphite and SiO
3) graphite and $SnO_2$
4) graphite and Si
5) graphite and Sn
6) non-graphitizable carbon and $Li_4Ti_5O_{12}$
7) non-graphitizable carbon and SiO
8) non-graphitizable carbon and $SnO_2$
9) non-graphitizable carbon and Si
10) non-graphitizable carbon and Sn
11) $Li_4Ti_5O_{12}$ and SiO
12) $Li_4Ti_5O_{12}$ and $SnO_2$
13) $Li_4Ti_5O_{12}$ and Si
14) $Li_4Ti_5O_{12}$ and Sn (Method 4)

A method of configuring the second power storage pack 12 to have a plurality of power storage devices, and to have parallel-connected power storage modules that differ in number of connection stages.

(Method 5)

A method of configuring the second power storage pack 12 to have multiple types of power storage modules including different types of power storage devices.

For example, it is conceivable that the second power storage pack 12 is adapted to include lithium ion storage batteries that differ in positive electrode active material, as with the following 1) to 8).

1) A lithium ion storage battery including $LiFePO_4$ as a positive electrode active material and a lithium ion storage battery including $LiCoO_2$ as a positive electrode active material.

2) A lithium ion storage battery including $LiFePO_4$ as a positive electrode active material and a lithium ion storage battery including $LiMn_2O_4$ as a positive electrode active material.

3) A lithium ion storage battery including $LiFePO_4$ as a positive electrode active material and a lithium ion storage battery including $Li_{(1+a)}Ni_xMn_yCo_zO_2$ ($0 \leq a \leq 0.5$, $0 \leq x \leq 1$, $0 \leq y \leq 1$, $0 \leq z \leq 1$, $x+y+z=1$) as a positive electrode active material.

4) A lithium ion storage battery including $LiFePO_4$ as a positive electrode active material and a lithium ion storage battery including $Li[Ni_xMn_{(2-x)}]O_4$ ($0 \leq x \leq 0.5$) as a positive electrode active material.

5) A lithium ion storage battery including $LiFePO_4$ as a positive electrode active material and a lithium ion storage battery including $LiMnPO_4$ as a positive electrode active material.

6) A lithium ion storage battery including $LiFePO_4$ as a positive electrode active material and a lithium ion storage battery including $LiCoPO_4$ as a positive electrode active material.

7) A lithium ion storage battery including $LiMn^2O_4$ as a positive electrode active material and a lithium ion storage battery including $Li[Ni_xMn_{(2-x)}]O_4$ ($0 \leq x \leq 0.5$) as a positive electrode active material.

8) A lithium ion storage battery including $LiMn_2O_4$ as a positive electrode active material and a lithium ion storage battery including $LiCoPO_4$ as a positive electrode active material.

For example, it is conceivable that the second power storage pack 12 is adapted to include lithium ion storage batteries that differ in negative electrode active material, as with the following 9) to 22).

9) A lithium ion storage battery including graphite as a negative electrode active material and a lithium ion storage battery including $Li_4Ti_5O_{12}$ as a negative electrode active material.

10) A lithium ion storage battery including graphite as a negative electrode active material and a lithium ion storage battery including SiO as a negative electrode active material.

11) A lithium ion storage battery including graphite as a negative electrode active material and a lithium ion storage battery including $SnO_2$ as a negative electrode active material.

12) A lithium ion storage battery including graphite as a negative electrode active material and a lithium ion storage battery including Si as a negative electrode active material.

13) A lithium ion storage battery including graphite as a negative electrode active material and a lithium ion storage battery including Sn as a negative electrode active material.

14) A lithium ion storage battery including non-graphitizable carbon as a negative electrode active material and a lithium ion storage battery including $Li_4Ti_5O_{12}$ as a negative electrode active material.

15) A lithium ion storage battery including non-graphitizable carbon as a negative electrode active material and a lithium ion storage battery including SiO as a negative electrode active material.

16) A lithium ion storage battery including non-graphitizable carbon as a negative electrode active material and a lithium ion storage battery including $SnO_2$ as a negative electrode active material.

17) A lithium ion storage battery including non-graphitizable carbon as a negative electrode active material and a lithium ion storage battery including Si as a negative electrode active material.

18) A lithium ion storage battery including non-graphitizable carbon as a negative electrode active material and a lithium ion storage battery including Sn as a negative electrode active material.

19) A lithium ion storage battery including $Li_4Ti_5O_{12}$ as a negative electrode active material and a lithium ion storage battery including SiO as a negative electrode active material.

20) A lithium ion storage battery including $Li_4Ti_5O_{12}$ as a negative electrode active material and a lithium ion storage battery including $SnO_2$ as a negative electrode active material.

21) A lithium ion storage battery including $Li_4Ti_5O_{12}$ as a negative electrode active material and a lithium ion storage battery including Si as a negative electrode active material.

22) A lithium ion storage battery including $Li_4Ti_5O_{12}$ as a negative electrode active material and a lithium ion storage battery including Sn as a negative electrode active material.

In addition, for example, the second power storage pack 12 may be adapted to include at least two types of power storage modules selected from the group consisting of a lithium ion storage battery module, a nickel-metal-hydride storage battery module, a lead storage battery module, and a capacitor.

(Method 6)

A method of configuring the second power storage pack 12 to have a plurality of parallel-connected power storage modules that differ in voltage from each other, a switch provided for at least one of the power storage modules, and a control unit that turns on/off the switch. In the case of the method 6, turning on/off the switch forms a step in a charge/discharge curve.

In the method 6, the power storage module which is relatively low in voltage is preferably provided with the switch. In this case, turning off the switch before the power storage module provided with the switch is overcharged can form a step in a charge/discharge curve.

On the other hand, when the power storage module which is relatively high in voltage is provided with the switch, turning off the switch before the power storage module provided with the switch is overdischarged can form a step in a charge/discharge curve.

It is to be noted that the (Method 1) to (Method 6) be appropriately combined and implemented.

A method of adopting, as the second power storage pack 12, a lithium ion storage battery pack including multiple types of lithium ion storage batteries, and causing the multiple types of lithium ion storage batteries to include multiple types of lithium ion storage batteries that have negative electrodes including different negative electrode active materials and multiple types of lithium ion storage batteries that have positive electrodes including different positive electrode active materials.

In the power storage systems 1, the ratio preferably falls within the range of 10:90 to 90:10 between the capacity on the lower SOC side of the start point of the step of the charge/discharge curve for the second power storage pack 12 and the capacity on the higher SOC side of the end point of the step of the charge/discharge curve for the second power storage pack 12. In this case, the second power storage pack 12 can effectively prevent deterioration due to both an overcharge state and an overdischarge state of the first power storage pack 11, thereby allowing a further increase in the life-span of the power storage system 1.

In the power storage system 1, the first power storage pack 11 is preferably higher in capacity than the second power storage pack 12. In addition, the ratio between the capacity of the first power storage pack 11 and the capacity of the second power storage pack 12 preferably falls within the range of 55:45 to 99:1. In this case, when an inexpensive lead storage battery pack is adopted for the first power storage pack 11, the inexpensive lead storage battery accounts for most of the capacity of the power storage system 1, thus allowing a further reduction in the price of the power storage system 1.

EXAMPLES

Example 1

Figure 6:
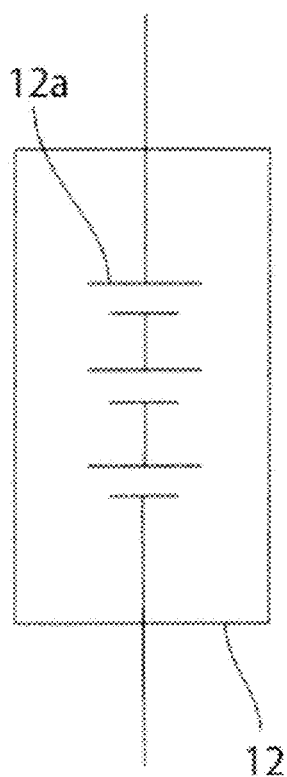
FIG. 6 is a schematic circuit diagram of a second power storage pack 12 fabricated according to Example 1.
Figure 7:
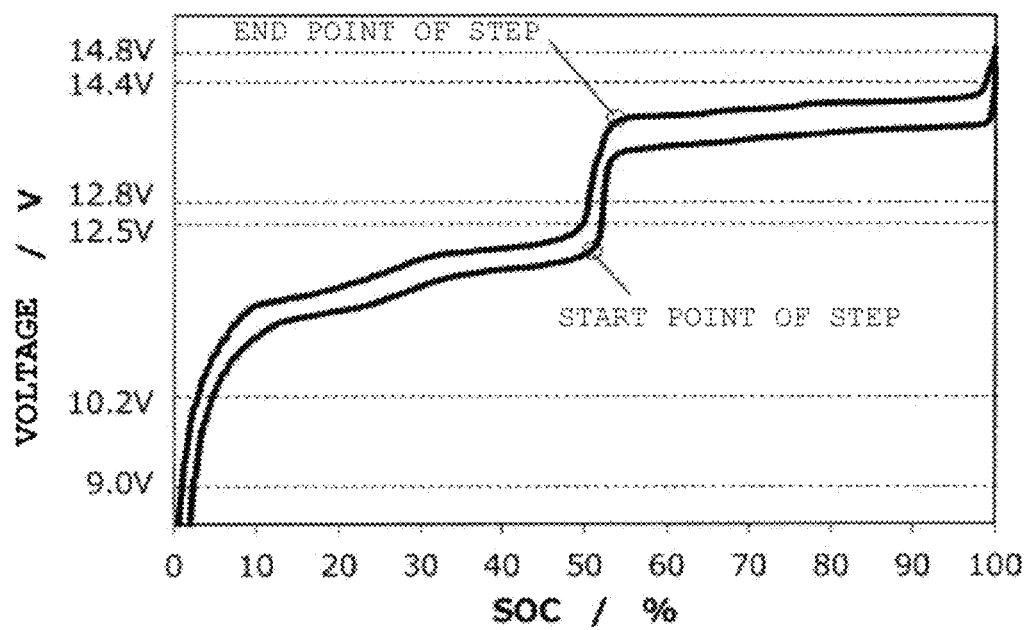
FIG. 7 is a charge discharge curve for the second power storage pack 12 fabricated according to Example 1.
Figure 8:
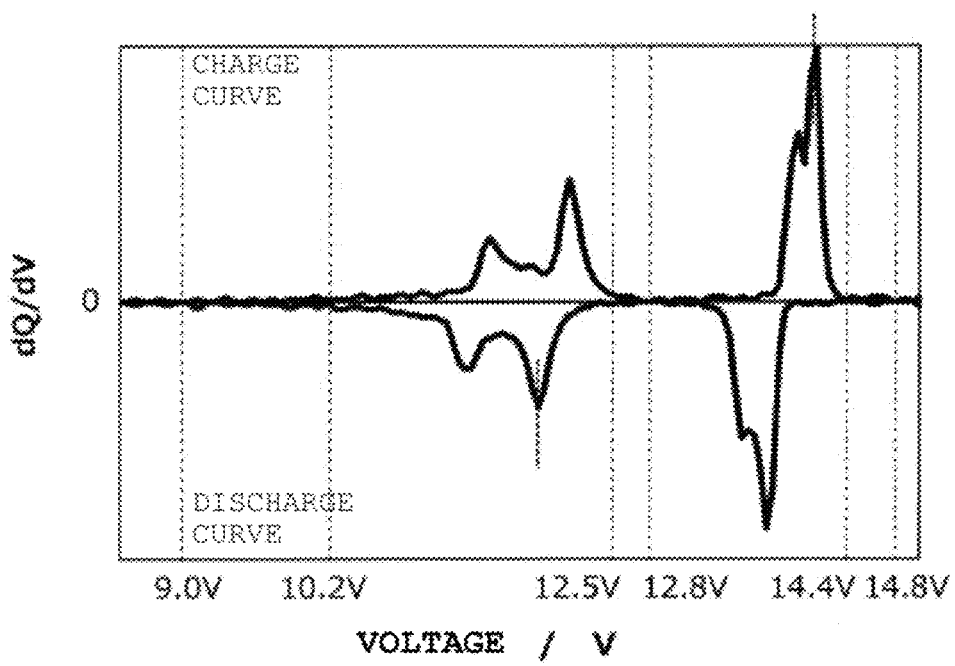
FIG. 8 is a curve (dQ/dV curve) obtained by differentiating the charge/discharge curve for the second power storage pack 12 fabricated according to Example 1 with respect to voltage.

Lithium ion storage batteries 12a with A/C ratio=1.2 and capacity of 1 Ah were prepared with the use of $Li[Ni_{0.25}Mn_{1.75}]O_4$ for a positive electrode active material and the use of graphite for a negative electrode active material. Three of the lithium ion storage batteries 12a were connected in series as shown in FIG. 6, thereby fabricating a second power storage pack 12, and a charge/discharge curve was measured. FIG. 7 shows therein a charge/discharge curve for the second power storage pack 12 fabricated according to Example 1. FIG. 8 shows therein a curve (dQ/dV curve) obtained by differentiating the charge/discharge curve for the second power storage pack 12 fabricated according to Example 1 with respect to voltage.

Example 2

Figure 9:
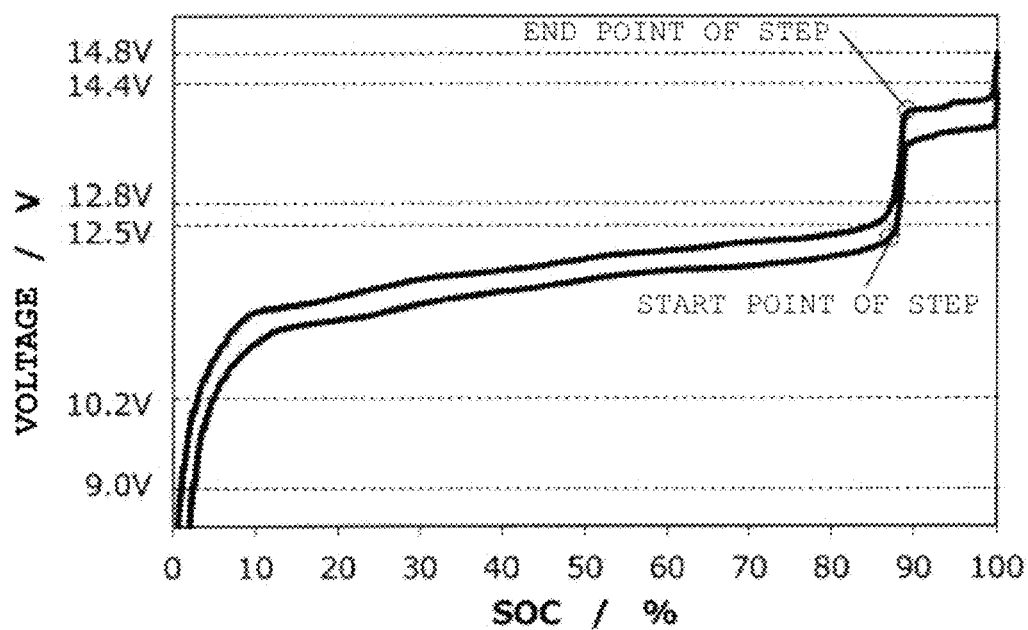
FIG. 9 is a charge/discharge curve for a second power storage pack 12 fabricated according to Example 2.
Figure 10:
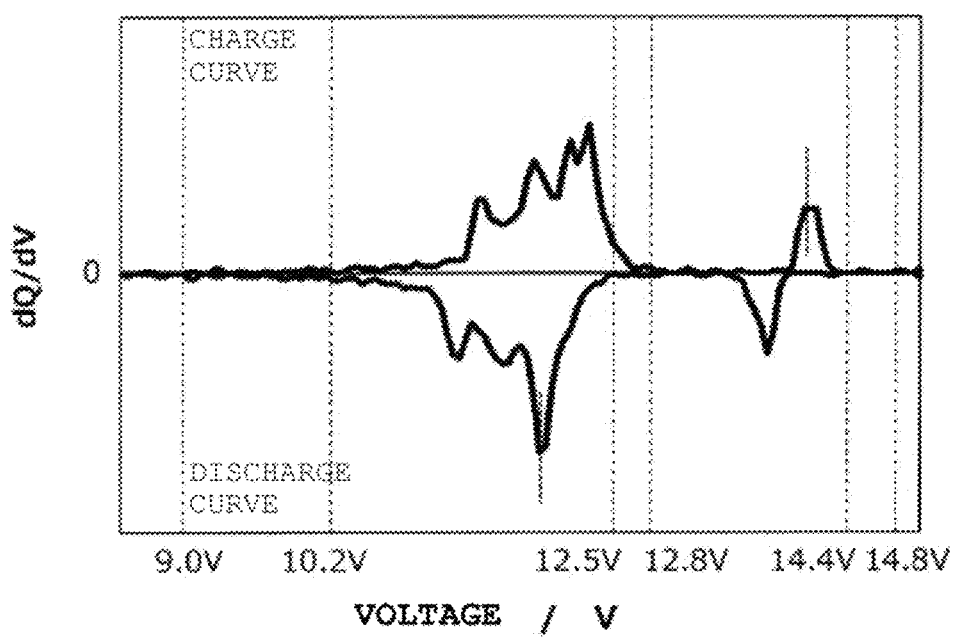
FIG. 10 is a curve (dQ/dV curve) obtained by differentiating the charge/discharge curve for the second power storage pack 12 fabricated according to Example 2 with respect to voltage.

In the same way as in Example 1, except for the use of $Li[Ni_{0.05}Mn_{1.95}]O_4$ as a positive electrode active material, a second power storage pack 12 was fabricated, and a charge/discharge curve was measured. FIG. 9 shows therein a charge discharge curve for the second power storage pack 12, and FIG. 10 shows therein a dQ/dV curve therefor.

Example 3

Figure 11:
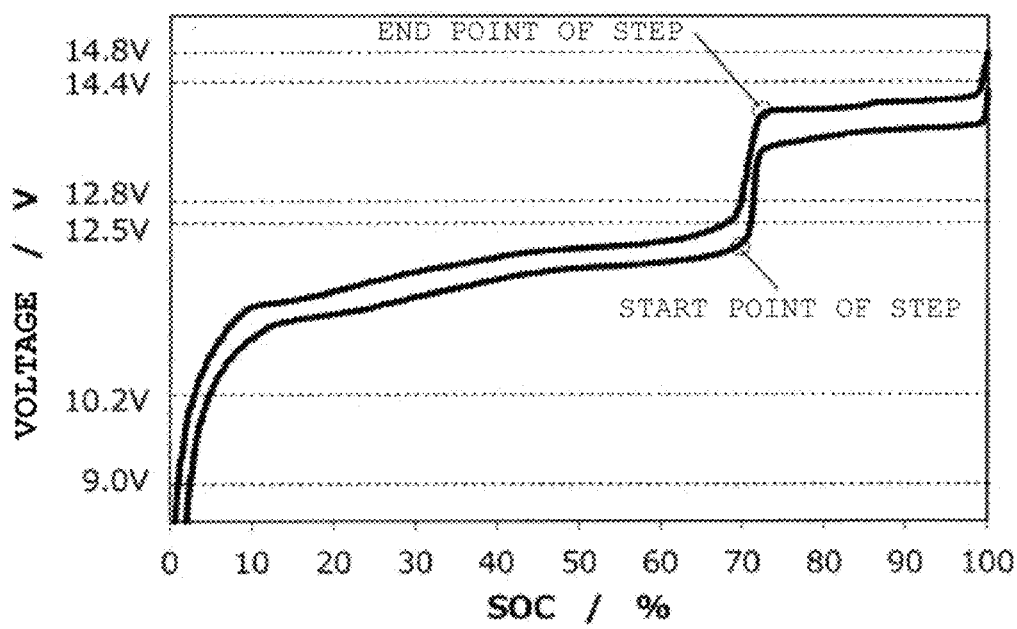
FIG. 11 is a charge discharge curve for a second power storage pack 12 fabricated according to Example 3.
Figure 12:
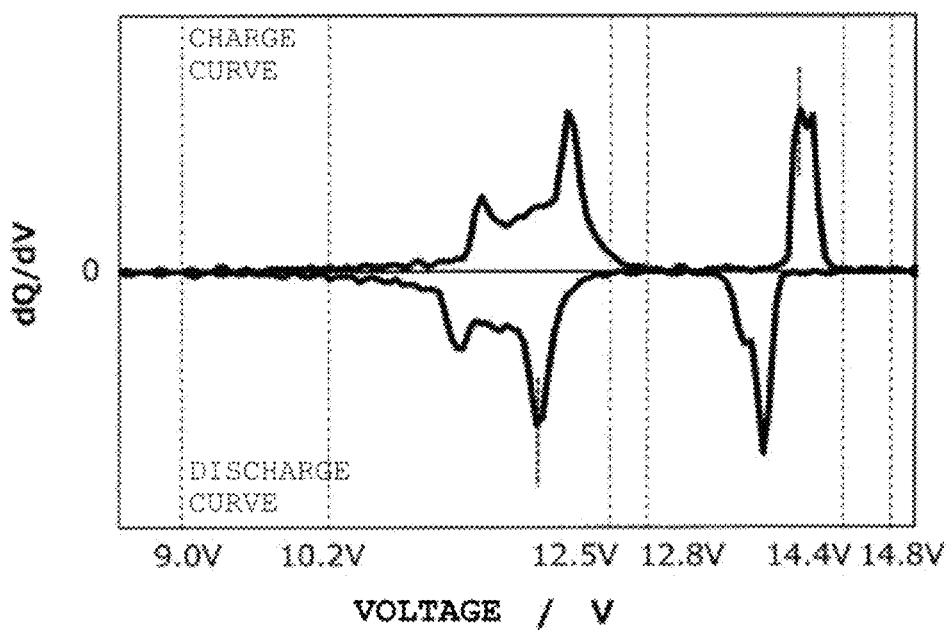
FIG. 12 is a curve (dQ/dV curve) obtained by differentiating the charge/discharge curve for the second power storage pack 12 fabricated according to Example 3 with respect to voltage.

In the same way as in Example 1, except for the use of $Li[Ni_{0.15}Mn_{1.85}]O_4$ as a positive electrode active material, a second power storage pack 12 was fabricated, and a charge/discharge curve was measured. FIG. 11 shows therein a charge/discharge curve for the second power storage pack 12, and FIG. 12 shows therein a dQ/dV curve therefor.

Example 4

Figure 13:
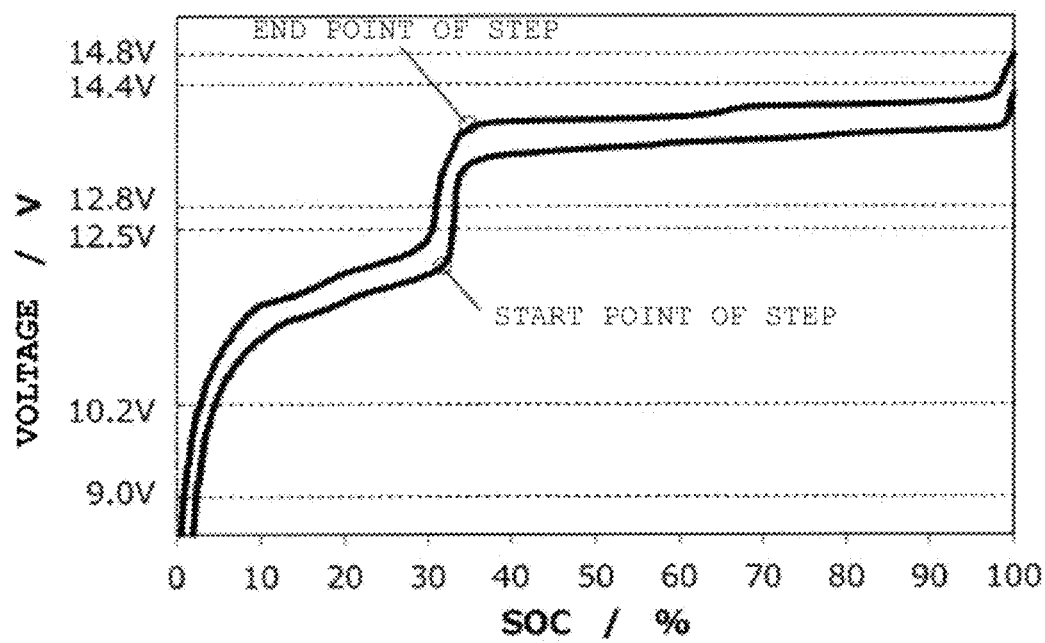
FIG. 13 is a charge discharge curve for a second power storage pack 12 fabricated according to Example 4.
Figure 14:
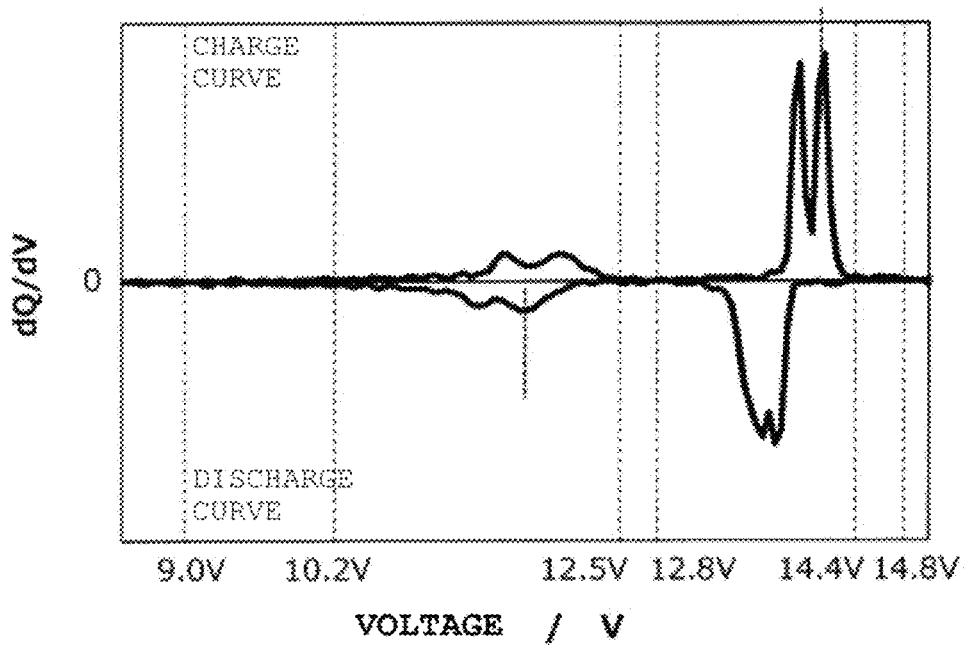
FIG. 14 is a curve (dQ/dV curve) obtained by differentiating the charge/discharge curve for the second power storage pack 12 fabricated according to Example 4 with respect to voltage.

In the same way as in Example 1, except for the use of Li[Ni$_{0.35}$Mn$_{1.65}$]O$_4$ as a positive electrode active material, a second power storage pack 12 was fabricated, and a charge/discharge curve was measured. FIG. 13 shows therein a charge/discharge curve for the second power storage pack 12, and FIG. 14 shows therein a dQ/dV curve therefor.

Example 5

Figure 15:
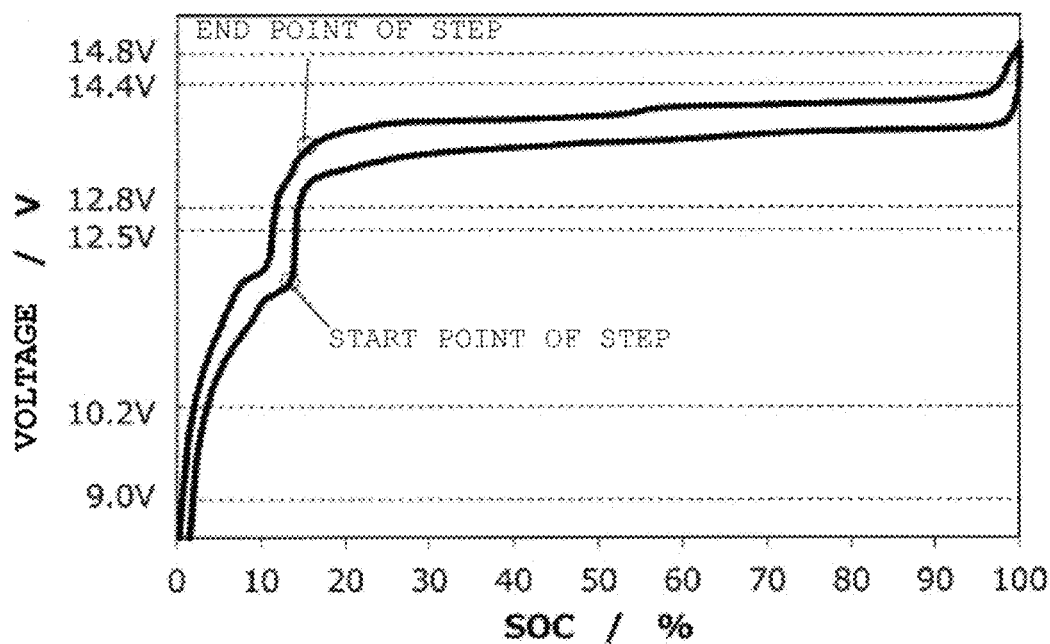
FIG. 15 is a charge discharge curve for a second power storage pack 12 fabricated according to Example 5.
Figure 16:
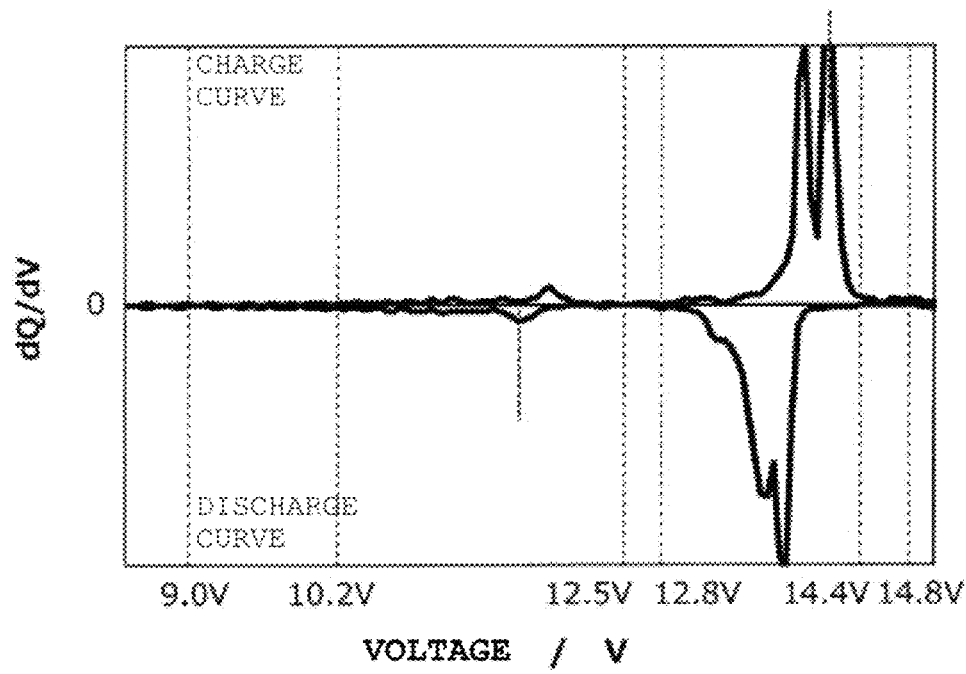
FIG. 16 is a curve (dQ/dV curve) obtained by differentiating the charge/discharge curve for the second power storage pack 12 fabricated according to Example 5 with respect to voltage.

In the same way as in Example 1, except for the use of Li[Ni$_{0.45}$Mn$_{1.55}$]O$_4$ as a positive electrode active material, a second power storage pack 12 was fabricated, and a charge/discharge curve was measured. FIG. 15 shows therein a charge/discharge curve for the second power storage pack 12, and FIG. 16 shows therein a dQ/dV curve therefor.

Reference Example 1

Figure 17:
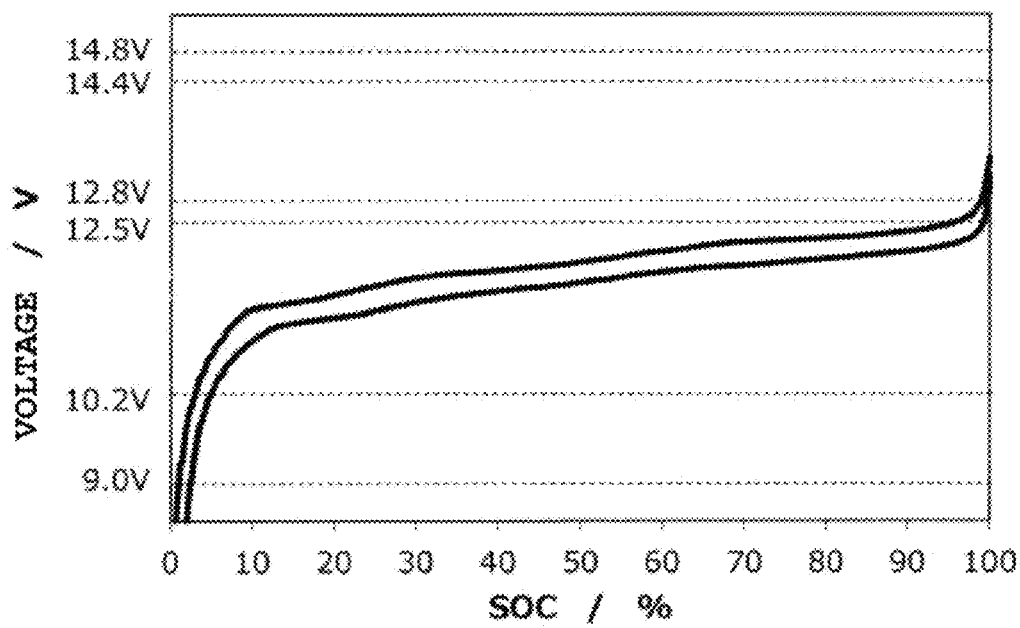
FIG. 17 is charge/discharge curve for a second power storage pack 12 fabricated according to Reference Example 1.
Figure 18:
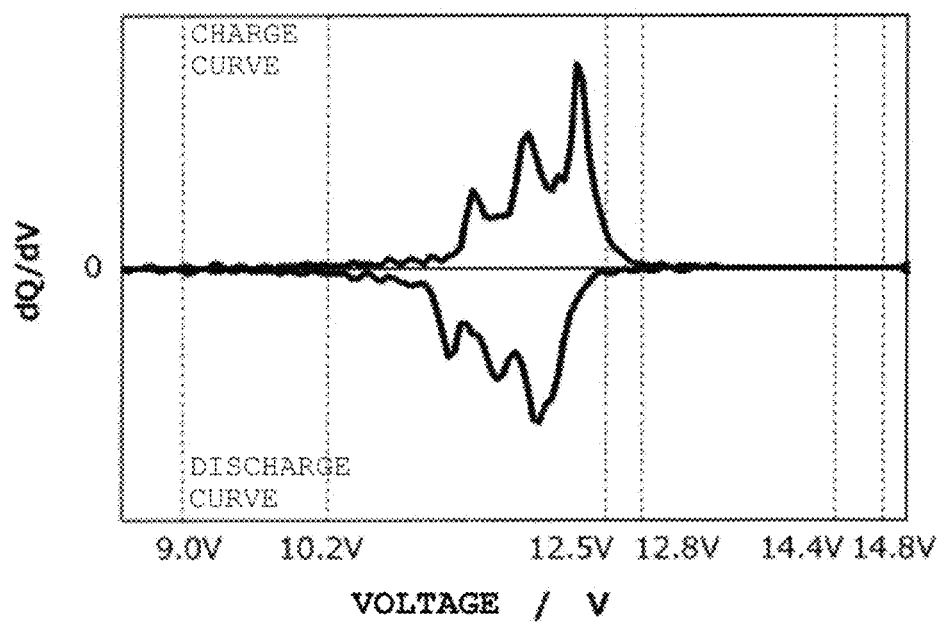
FIG. 18 is a curve (dQ/dV curve) obtained by differentiating the charge/discharge curve for the second power storage pack 12 fabricated according to Reference Example 1 with respect to voltage.

In the same way as in Example 1, except for the use of LiMn$_2$O$_4$ as a positive electrode active material, a second power storage pack 12 was fabricated, and a charge/discharge curve was measured. FIG. 17 shows therein a charge/discharge curve for the second power storage pack 12, and FIG. 18 shows therein a dQ/dV curve therefor.

Reference Example 2

Figure 19:
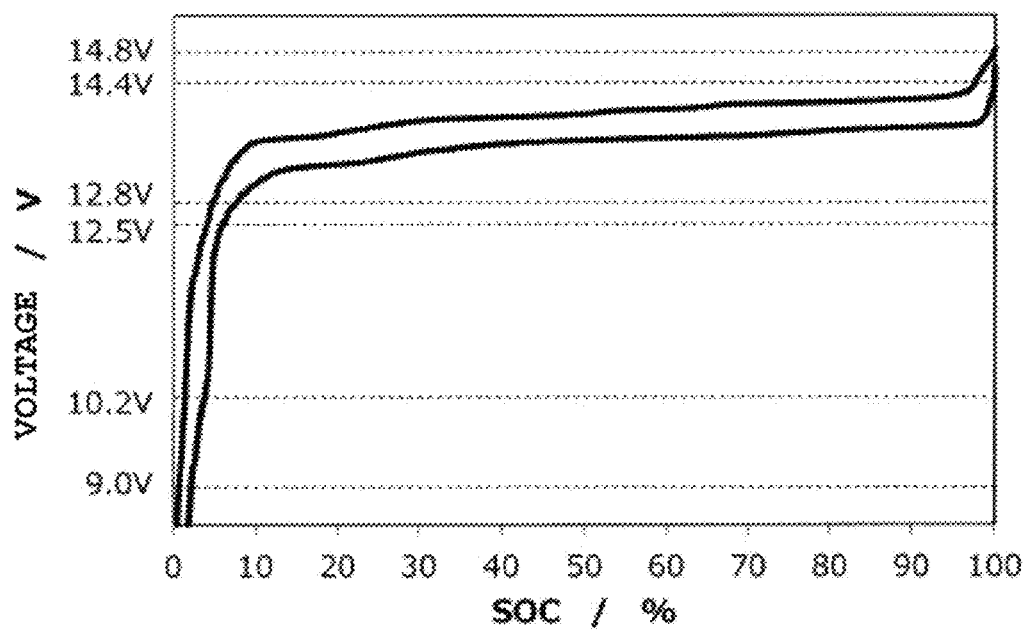
FIG. 19 is charge/discharge curve for a second power storage pack 12 fabricated according to Reference Example 2.
Figure 20:
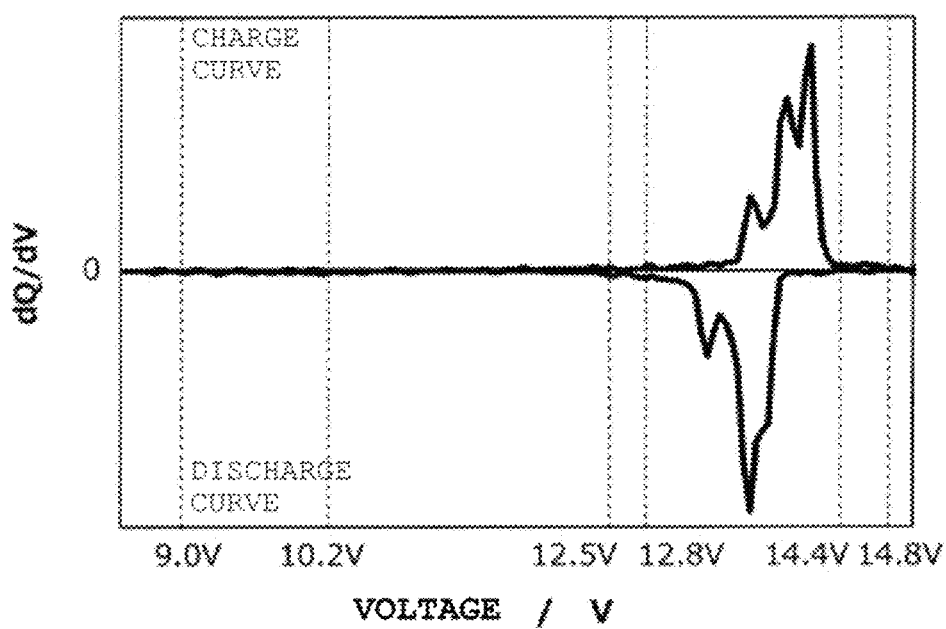
FIG. 20 is a curve (dQ/dV curve) obtained by differentiating the charge/discharge curve for the second power storage pack 12 fabricated according to Reference Example 2 with respect to voltage.

In the same way as in Example 1, except for the use of Li[Ni$_{0.50}$Mn$_{1.50}$]O$_4$ as a positive electrode active material, a second power storage pack 12 was fabricated, and a charge/discharge curve was measured. FIG. 19 shows therein a charge/discharge curve for the second power storage pack 12, and FIG. 20 shows therein a dQ/dV curve therefor.

Example 6

Figure 21:
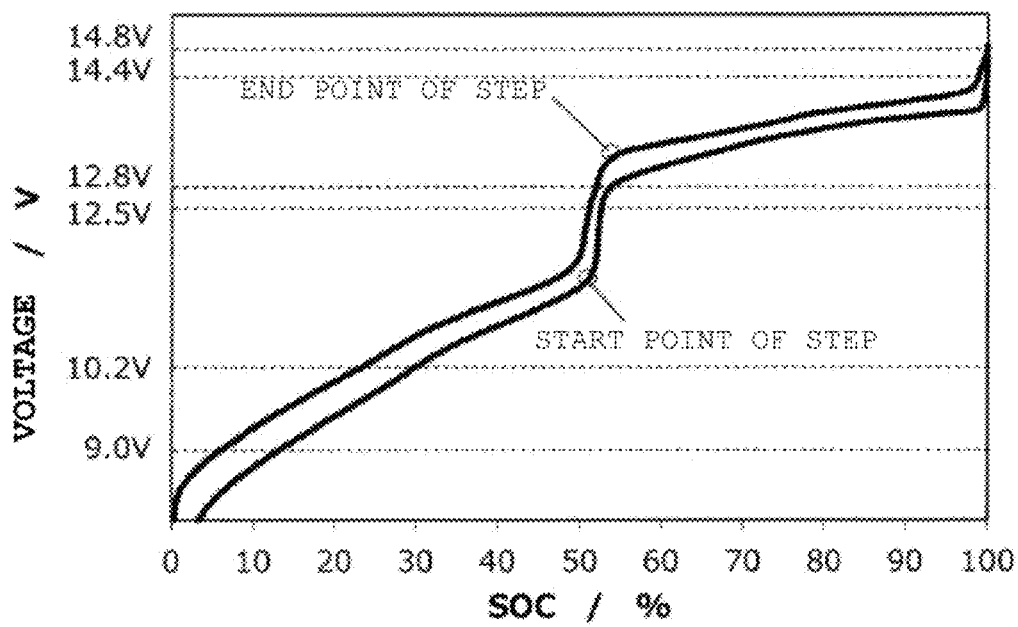
FIG. 21 is a charge/discharge curve for a second power storage pack 12 fabricated according to Example 6.
Figure 22:
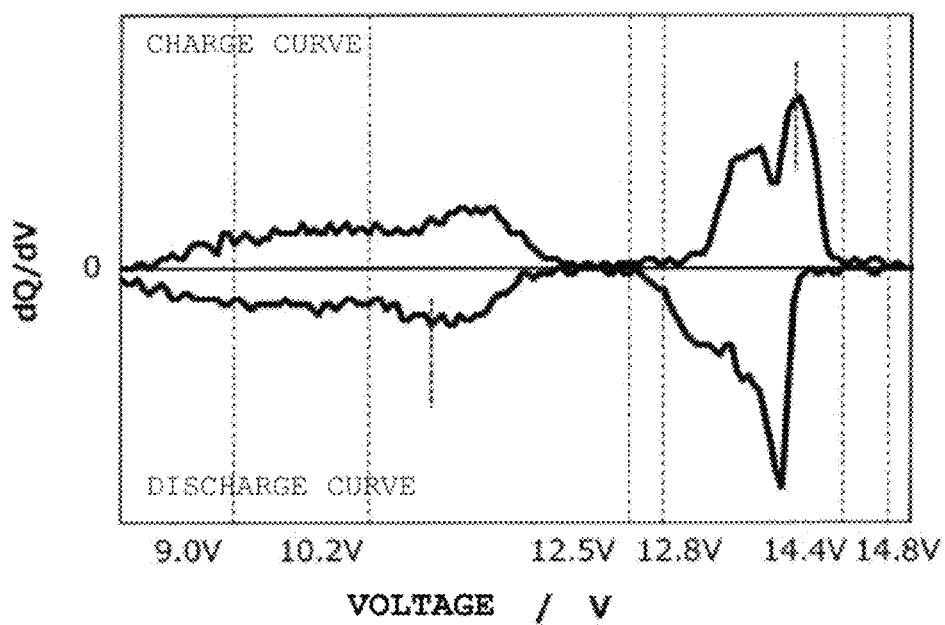
FIG. 22 is a curve (dQ/dV curve) obtained by differentiating the charge/discharge curve for the second power storage pack 12 fabricated according to Example 6 with respect to voltage.

In the same way as in Example 1, except for the use of Li[Ni$_{0.25}$Mn$_{1.75}$]O$_4$ as a positive electrode active material and the use of hard carbon as a negative electrode active material, a second power storage pack 12 was fabricated, and a charge/discharge curve was measured. FIG. 21 shows therein a charge/discharge curve for the second power storage pack 12, and FIG. 22 shows therein a dQ/dV curve therefor.

Example 7

Figure 23:
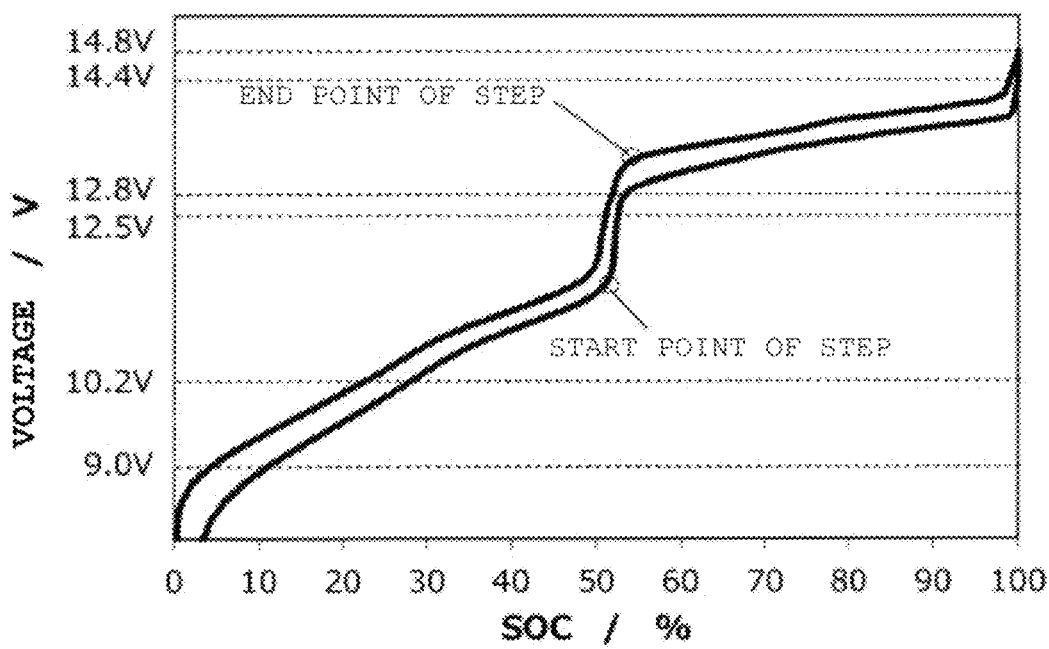
FIG. 23 is a charge/discharge curve for a second power storage pack 12 fabricated according to Example 7.
Figure 24:
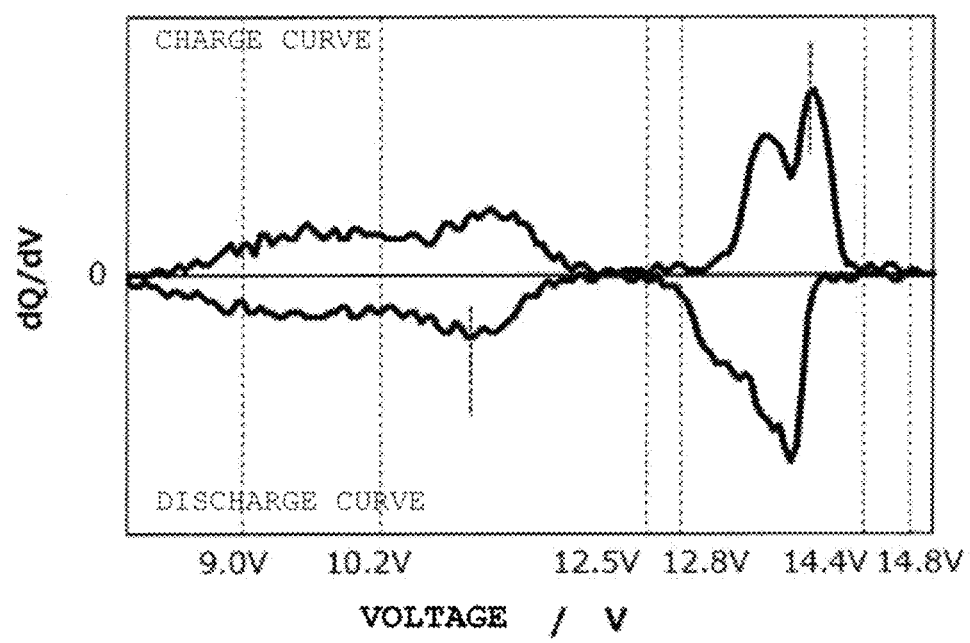
FIG. 24 is a curve (dQ/dV curve) obtained by differentiating the charge/discharge curve for the second power storage pack 12 fabricated according to Example 7 with respect to voltage.

In the same way as in Example 6, except for the use of soft carbon as a negative electrode active material, a second power storage pack 12 was fabricated, and a charge/discharge curve was measured. FIG. 23 shows therein a charge/discharge curve for the second power storage pack 12, and FIG. 24 shows therein a dQ/dV curve therefor.

Example 8

Figure 25:
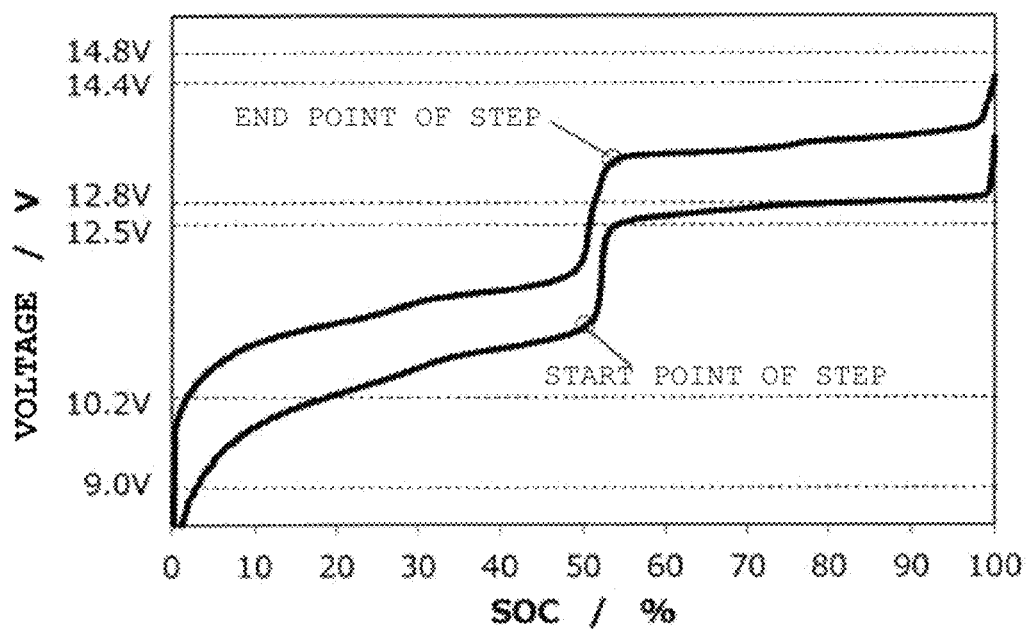
FIG. 25 is a charge/discharge curve for a second power storage pack 12 fabricated according to Example 8.
Figure 26:
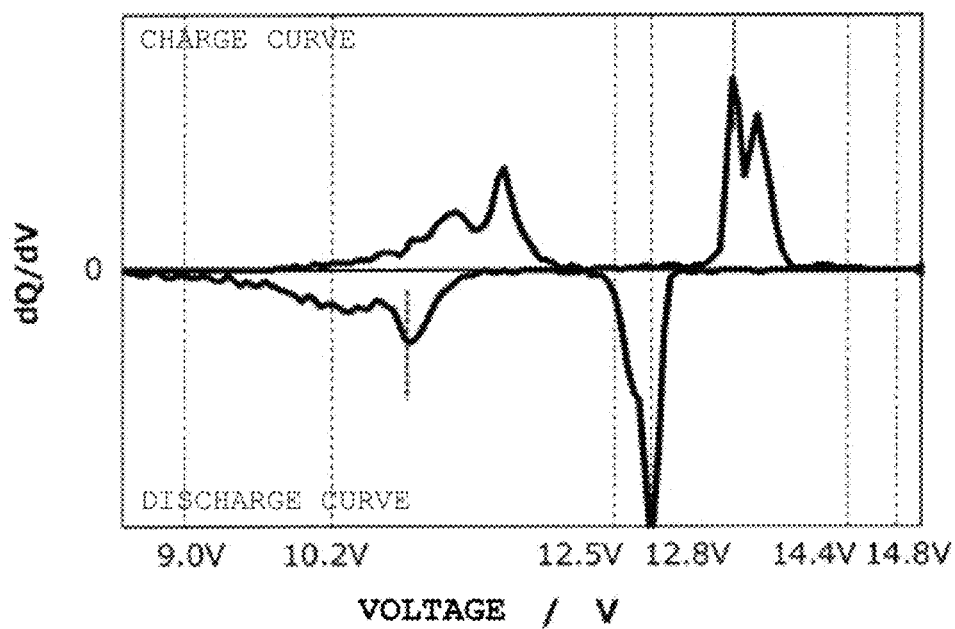
FIG. 26 is a curve (dQ/dV curve) obtained by differentiating the charge/discharge curve for the second power storage pack 12 fabricated according to Example 8 with respect to voltage.

In the same way as in Example 6, except for the use of Si as a negative electrode active material and for the A/C ratio=2.0, a second power storage pack 12 was fabricated, and a charge/discharge curve was measured. FIG. 25 shows therein a charge/discharge curve for the second power storage pack 12, and FIG. 26 shows therein a dQ/dV curve therefor.

Example 9

Figure 27:
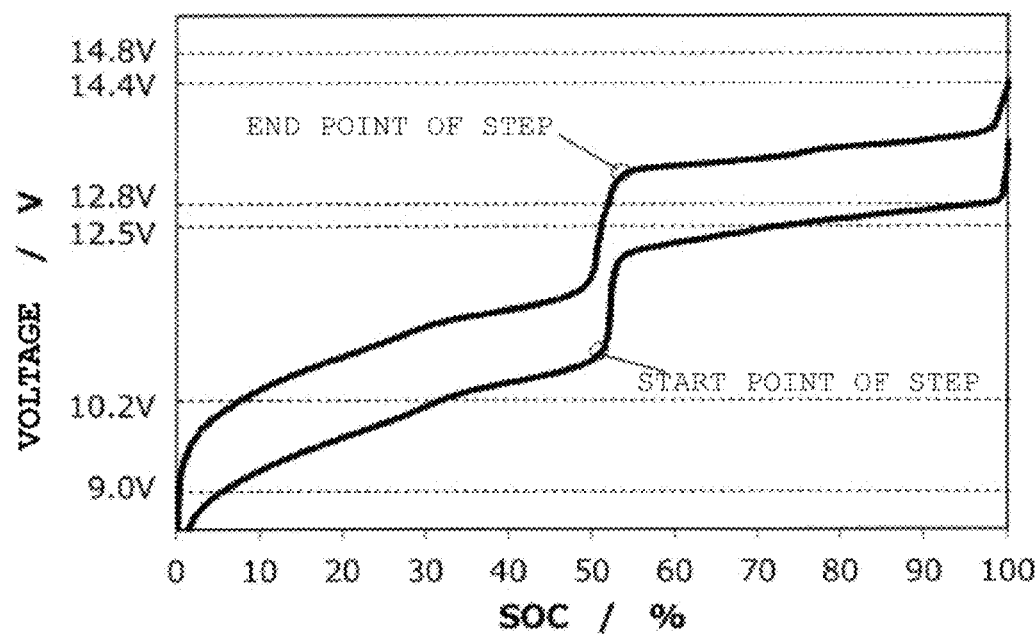
FIG. 27 is a charge/discharge curve for a second power storage pack 12 fabricated according to Example 9.
Figure 28:
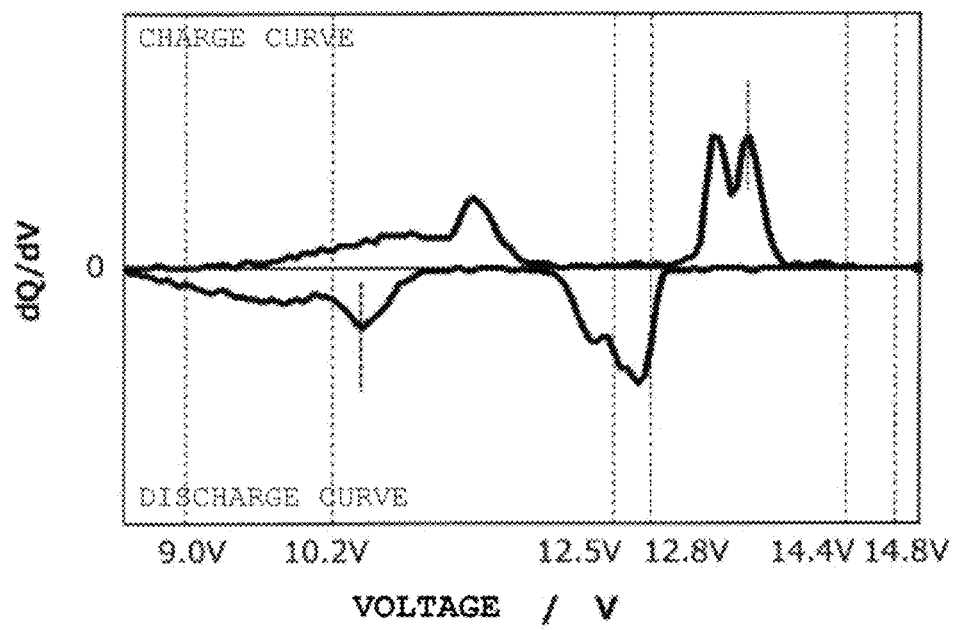
FIG. 28 is a curve (dQ/dV curve) obtained by differentiating the charge/discharge curve for the second power storage pack 12 fabricated according to Example 9 with respect to voltage.

In the same way as in Example 6, except for the use of, as a negative electrode active material, SnO$_2$ subjected to electrochemical pre-doping treatment with lithium ions, and for the A/C ratio=1.5, a second power storage pack 12 was fabricated, and a charge/discharge curve was measured. FIG. 27 shows therein a charge/discharge curve for the second power storage pack 12, and FIG. 28 shows therein, a dQ/dV curve therefor.

Tables 1 and 2 show various types of data on Examples 1 to 9.

From the results of Examples 1 to 9, it is determined that the use of Li[Ni$_x$Mn$_{(2-x)}$]O$_4$ (0.05≤x≤0.45) as a positive electrode active material for a charge/discharge curve with a step makes it possible to design the second power storage pack 12 that satisfies at least one of the conditions (a), (b), and (c) and conditions (a), (d), and (e) mentioned above, in the case of using a lead storage battery pack as the first power storage pack 11.

In the case of the Li[Ni$_x$Mn$_{(2-x)}$]O$_4$ (0.05≤x≤0.45), the positions of the start point of the step and of the end point of the step can be easily adjusted by adjusting the value of x in the active material composition and the synthesis condition, and the ratio between the capacity on the lower SOC side of the start point of the step and the capacity on the higher SOC side of the end point of the step can be thus easily adjusted. In addition, the positions of the start point of the step and of the end point of the step can be adjusted by not only the value of x and the synthesis condition, but also the addition of different types of elements (for example, Li, Ti, Al, Mg, B, Cr, Co) or the substitution of the different types of elements for Ni or Mn.

Example 10

Figure 29:
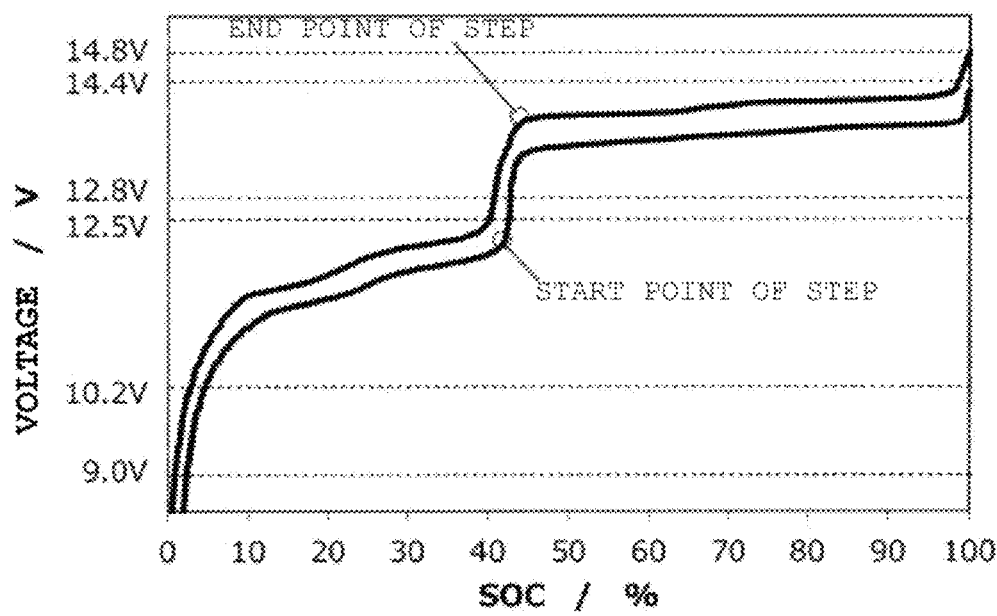
FIG. 29 is a charge/discharge curve for a second power storage pack 12 fabricated according to Example 10.
Figure 30:
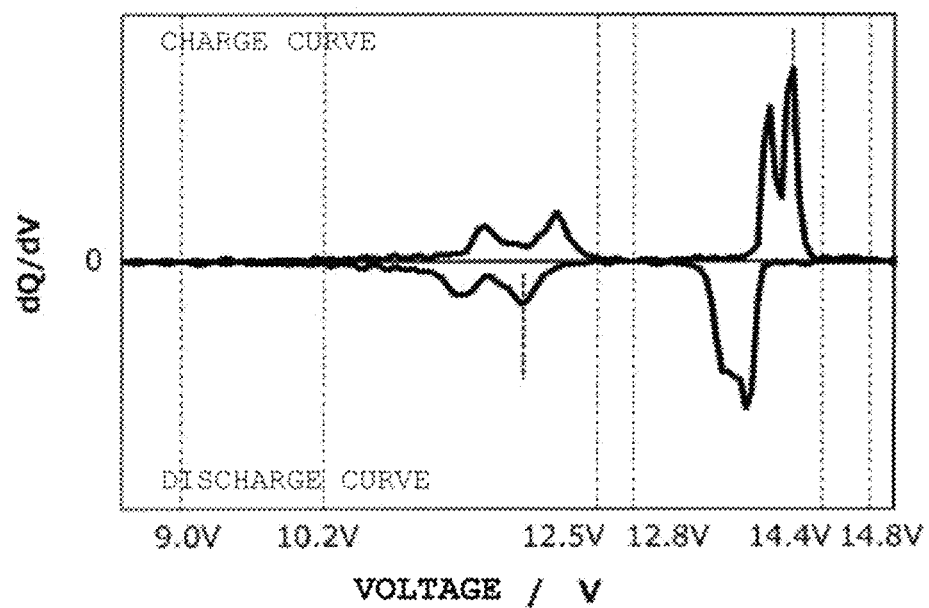
FIG. 30 is a curve (dQ/dV curve) obtained by differentiating the charge/discharge curve for the second power storage pack 12 fabricated according to Example 10 with respect to voltage.

Lithium ion storage battery devices 12a with A/C ratio=1.2 and capacity of 1 Ah were prepared with the use of, as a positive electrode active material, LiMnO$_2$O$_4$ and Li[Ni$_{0.5}$Mn$_{1.5}$]O$_4$ mixed at 40:60 in ratio by weight and the use of graphite for negative electrode active material. Three of the lithium ion storage battery devices 12a were connected,in series as shown in FIG. 6, thereby fabricating a second power storage pack 12, and a charge,/discharge curve was measured. FIG. 29 shows therein a charge/discharge curve for the second power storage pack 12, and FIG. 30 shows therein a dQ/dV curve therefor.

Example 11

Figure 32:
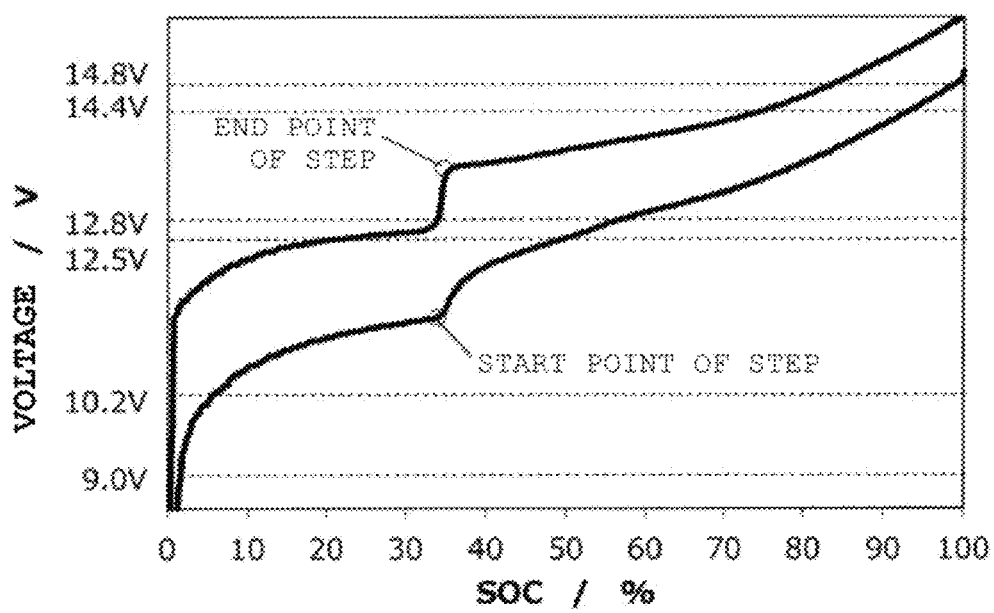
FIG. 32 is a charge/discharge curve for the second power storage pack 12 fabricated according to Example 11.
Figure 33:
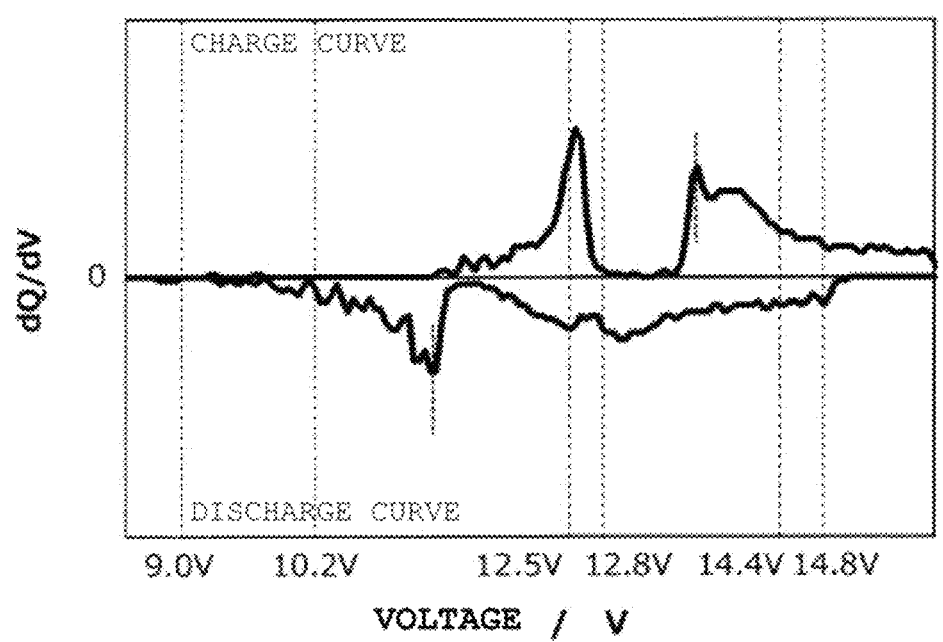
FIG. 33 is a curve (dQ/dV curve) obtained by differentiating the charge/discharge curve for the second power storage pack 12 fabricated according to Example 11 with respect to voltage.

Lithium ion storage batteries 12a with A/C ratio=3.0 and capacity of 10 Ah were prepared with the use of, as a positive electrode active material, LiFePO$_4$ and LiNi$_{1/3}$Co$_{1/3}$Mn$_{1/3}$O$_2$ mixed at 35:65 in ratio by weight and the use of Si as a negative electrode active material. Four of the lithium ion storage batteries 12a were connected in series as shown in FIG. 33, thereby fabricating a second power storage pack 12, and a charge/discharge curve was measured. FIG. 32 shows therein a charge/discharge curve for the second power storage pack 12, and FIG. 33 shows therein a dQ/dV curve therefor.

Example 12

Figure 34:
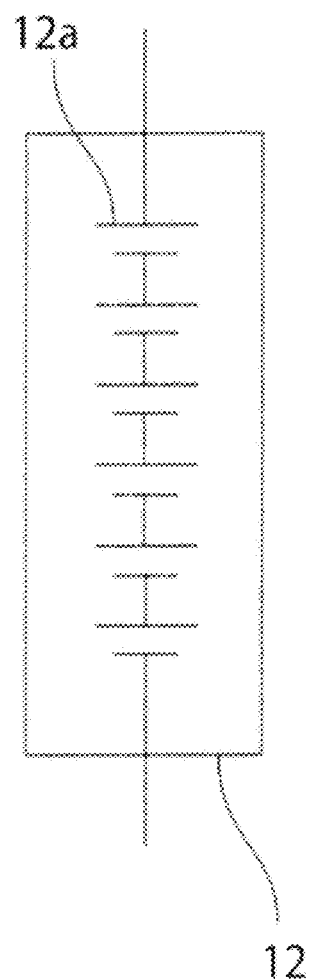
FIG. 34 is a schematic circuit diagram of a second power storage pack fabricated according to Example 12.
Figure 35:
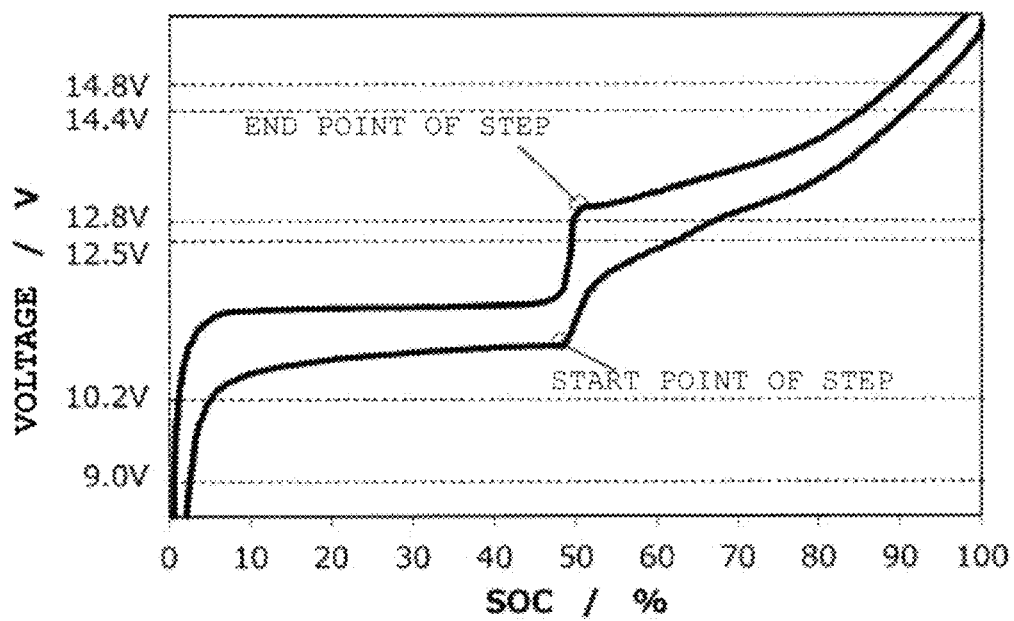
FIG. 35 is a charge/discharge curve for the second power storage pack 12 fabricated according to Example 12.
Figure 36:
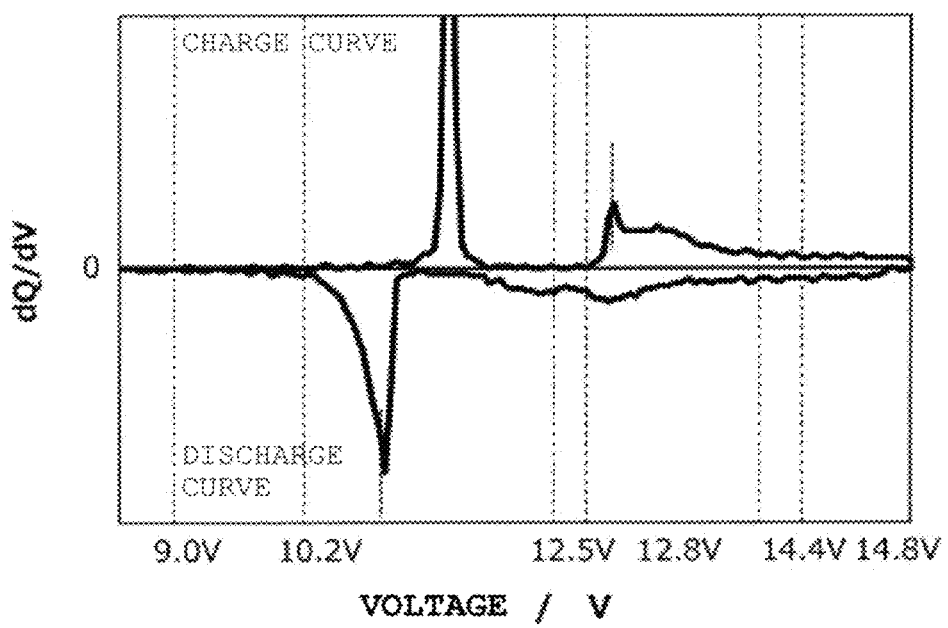
FIG. 36 is a curve (dQ/dV curve) obtained by differentiating the charge/discharge curve for the second power storage pack 12 fabricated according to Example 12 with respect to voltage.

Lithium ion storage batteries 12a with A/C ratio=1.2 and capacity of 10 Ah were prepared with the use of, as a positive electrode active material, LiFePO$_4$ and LiNi$_{1/3}$Co$_{1/3}$Mn$_{1/3}$O$_2$ mixed at 50:50 in ratio by weight and the use of Li$_4$Ti$_5$O$_{12}$ as a negative electrode active material. Six of the lithium ion storage battery devices 12*a* were connected in series as shown in FIG. 34, thereby fabricating a second power storage pack 12, and a charge/discharge curve was measured. FIG. 35 shows therein a charge/discharge curve for the second power storage pack 12, and FIG. 36 shows therein a dQ/dV curve therefor.

Tables 1 and 2 show various types of data on Examples 10 to 12.

From the results of Examples 10 to 12, it is determined that the use of multiple types of positive electrode active materials makes it possible to design the second power storage pack 12 that satisfies at least one of the conditions (a), (b), and (c) and conditions (a), (d), and (e) mentioned above, in the case of using a lead storage battery pack as the first power storage pack 11. In addition, the positions of the start point and the end point of the step of the charge/discharge curve can be easily adjusted by changing the mixture ratio of the positive electrode active material. Thus, the ratio between the capacity on the lower SOC side of the start point of the step and the capacity on the higher SOC side of the end point of the step can be easily adjusted.

Example 13

Figure 37:
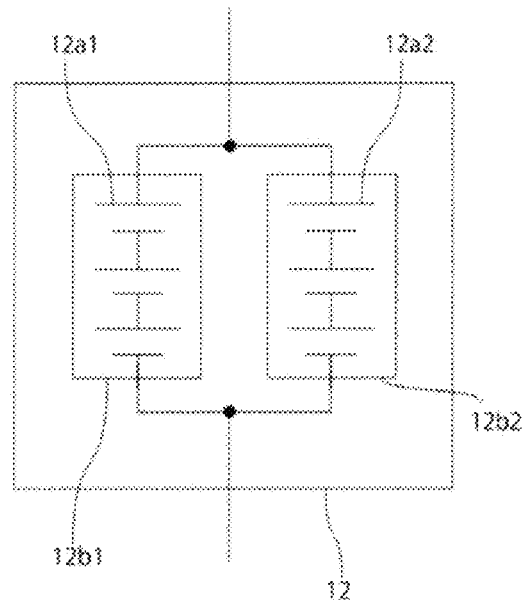
FIG. 37 is a schematic circuit diagram of a second power storage pack fabricated according to Example 13.
Figure 38:
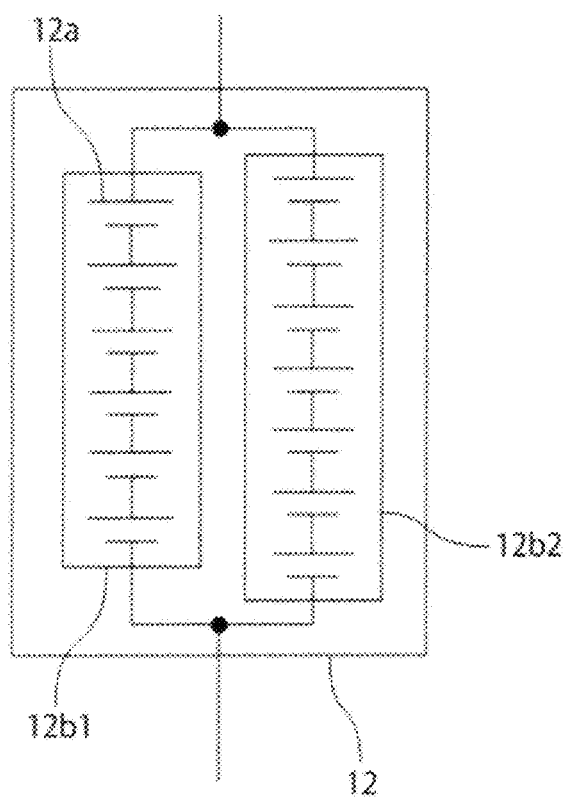
FIG. 38 is a schematic circuit diagram of a second power storage pack fabricated according to Example 14.

Lithium ion storage batteries 12*a*1 with A/C ratio=1.2 and capacity of 4 Ah were prepared with the use of LiMn$_2$O$_4$ as a positive electrode active material and the use of graphite as a negative electrode active material. In addition, lithium ion storage batteries 12*a*2 with A/C ratio=1.2 and capacity of 6 Ah were prepared with the use of Li[Ni$_{0.5}$Mn$_{1.5}$]O$_4$ as a positive electrode active material and the use of graphite as a negative electrode active material. Next, as shown in FIG. 37, a lithium ion power storage module 12*b*1 with three of the lithium ion storage batteries 12*a*1 connected in series and a lithium ion power storage module 12*b*2 with three of the lithium ion storage batteries 12*a*2 connected in series were connected in parallel, thereby fabricating a second power storage pack 12, and a charge/discharge curve was measured. The measured charge/discharge curve was similar to the charge/discharge curve (FIGS. 29, 30) according to Example 10.

Example 14

Figure 39:
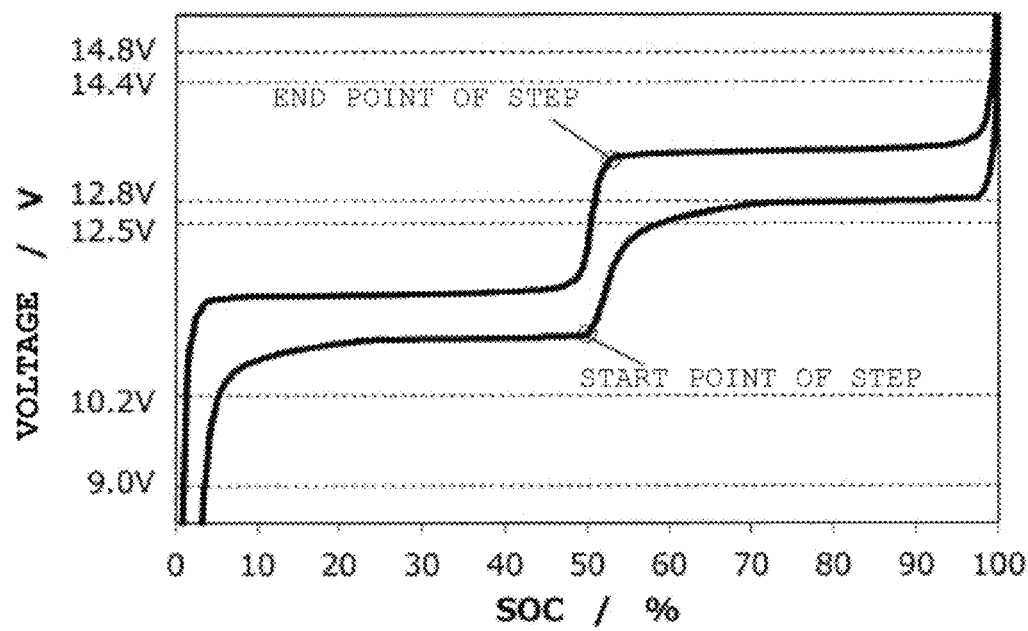
FIG. 39 is a charge/discharge curve for the second power storage pack 12 fabricated according to Example 14.
Figure 40:
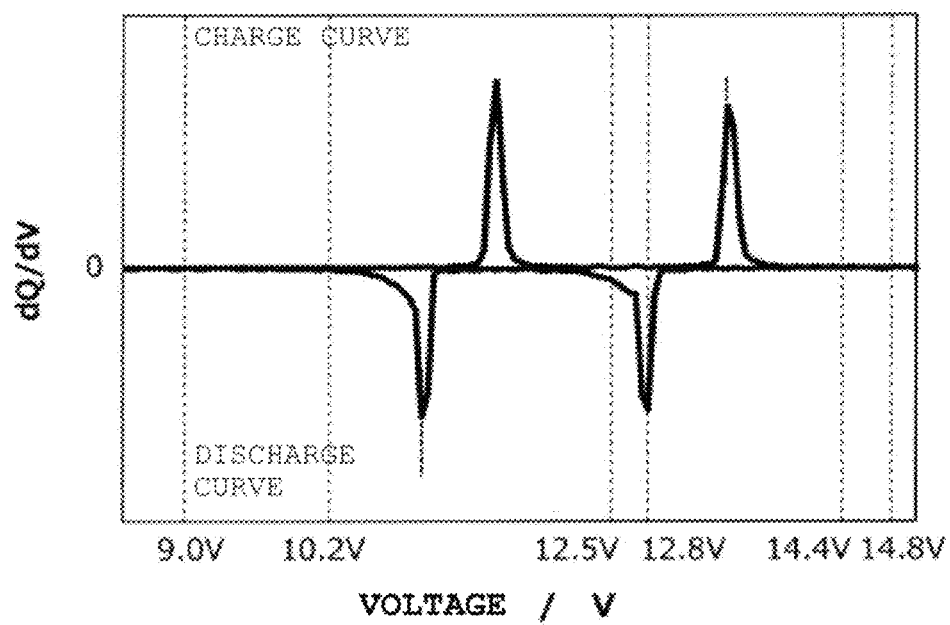
FIG. 40 is a curve (dQ/dV curve) obtained by differentiating the charge/discharge curve for the second power storage pack 12 fabricated according to Example 14 with respect to voltage.

Lithium ion storage batteries 12*a* with A/C ratio=1.2 and capacity of 5 Ah were prepared with the use of LiFePO$_4$ as a positive electrode active material and the use of Li$_4$Ti$_5$O$_{12}$ as a negative electrode active material. Next, as shown in FIG. 40, a lithium ion power storage module 12*b*1 composed of six of the lithium ion storage batteries 12*a* connected in series and a lithium ion power storage module 12*b*2 composed of seven of the lithium ion storage batteries 12*a* connected in series were connected in parallel, thereby fabricating a second power storage pack 12, and a charge/discharge curve was measured. FIG. 39 shows therein a charge/discharge curve for the second power storage pack 12, and FIG. 40 shows therein a dQ/dV curve therefor.

As can be seen from the result of Example 14, it is determined that the parallel connection of multiple power storage modules that differ in number of series connections makes it possible to design the second power storage pack 12 that satisfies at least one of the conditions (a), (b), and (c) and conditions (a), (d), and (e) mentioned above, in the case of using a lead storage battery pack as the first power storage pack 11. In addition, when the capacity ratio between the two power storage modules is changed, the positions of the start point of the step and of the end point of the step can be adjusted, and the ratio between the capacity on the lower SOC side of the start point of the step and the capacity on the higher SOC side of the end point of the step can be thus also adjusted.

Example 15

Figure 41:
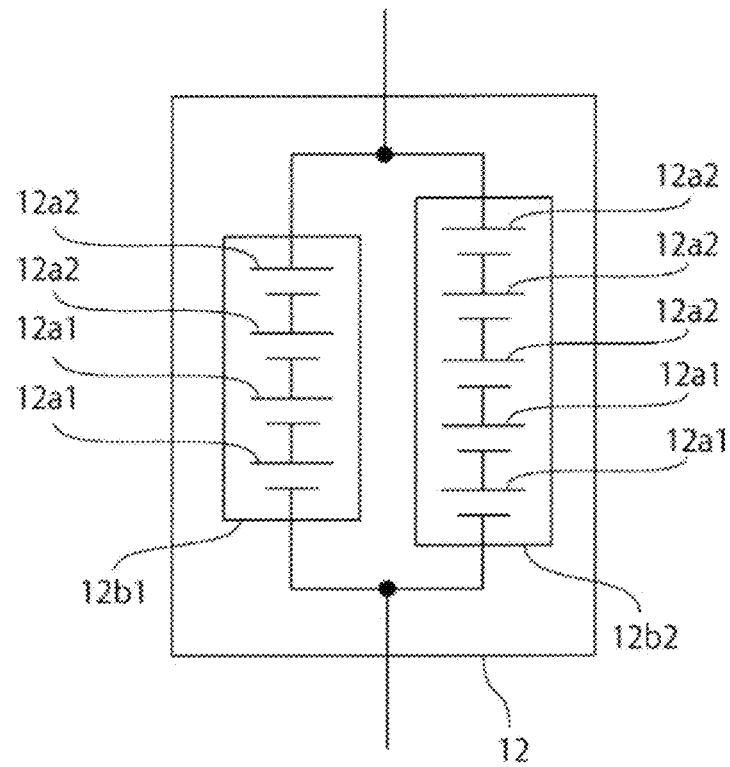
FIG. 41 is a schematic circuit diagram of a second power storage pack fabricated according to Example 15.
Figure 42:
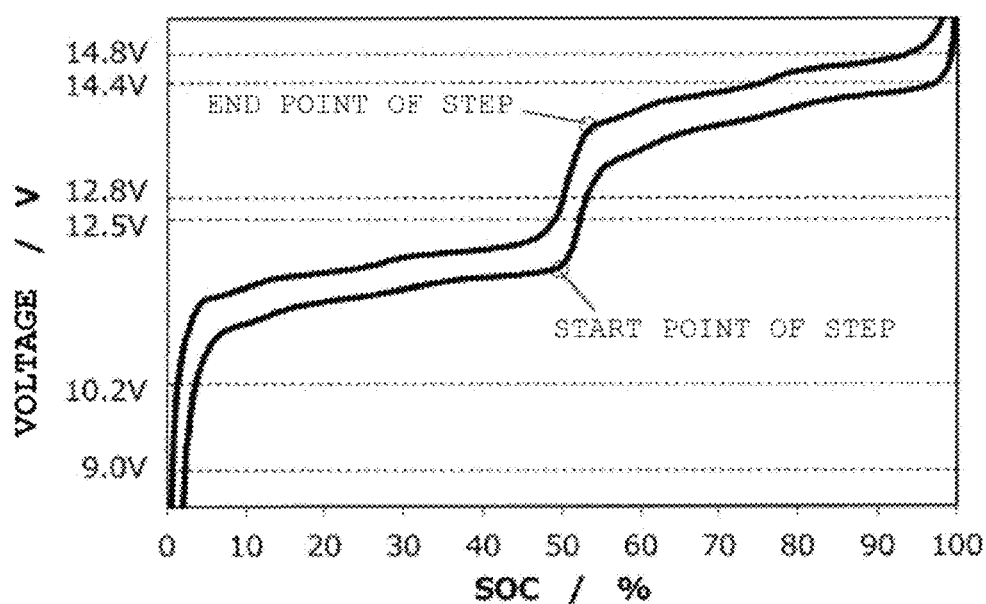
FIG. 42 is a charge/discharge curve for the second power storage pack 12 fabricated according to Example 15.
Figure 43:
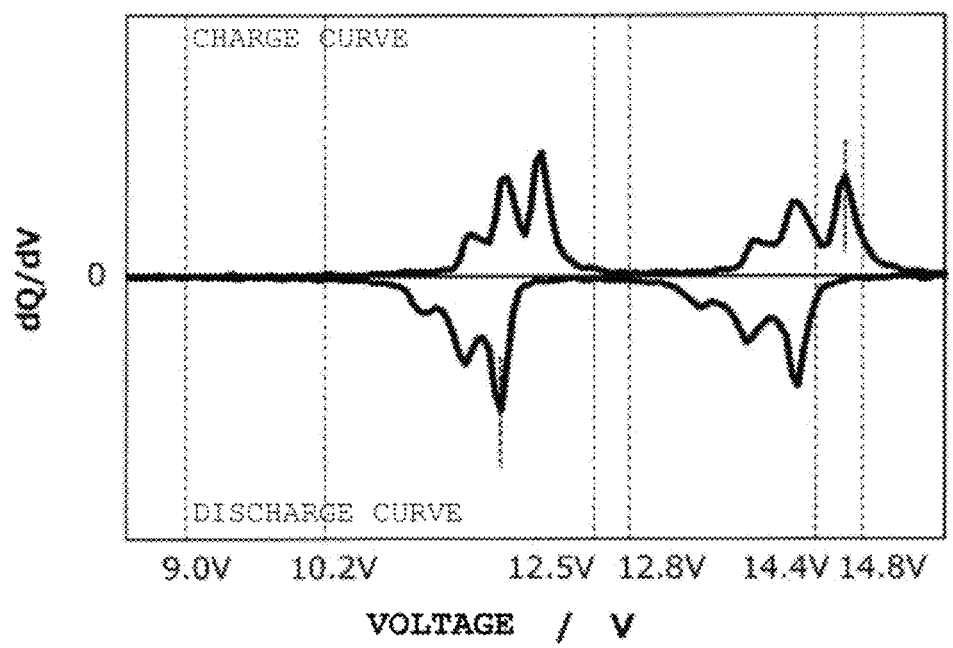
FIG. 43 is a curve (dQ/dV curve) obtained by differentiating the charge/discharge curve for the second power storage pack 12 fabricated according to Example 15 with respect to voltage.

Lithium ion storage batteries 12*a*1 with A/C ratio=1.2 and capacity of 5 Ah were prepared with the use of LiFePO$_4$ as a positive electrode active material and the use of graphite as a negative electrode active material. Lithium ion storage batteries 12*a*2 with A/C ratio=1.2 and capacity of 5 Ah were prepared with the use of LiMn$_2$O$_4$ as a positive electrode active material and the use of Li$_4$Ti$_5$O$_{12}$ for a negative electrode active material. Next, as shown in FIG. 41, a lithium ion power storage module 12*b*1 composed of two of the lithium ion storage batteries 12*a*1 and two of the lithium ion storage batteries 12*a*2 connected in series, and a lithium ion power storage module 12*b*2 composed of two of the lithium ion storage batteries 12*a*1 and three of the lithium ion storage batteries 12*a*2 connected in series were connected in parallel, thereby fabricating a second power storage pack 12, and a charge/discharge curve was measured. FIG. 42 shows therein a charge/discharge curve for the second power storage pack 12, and FIG. 43 shows therein a dQ/dV curve therefor.

From the result presented in Example 15, it is determined that the parallel connection of multiple power storage modules that use different types of lithium ion storage batteries makes it possible to design the second power storage pack 12 that satisfies at least one of the conditions (a), (b), and (c) and conditions (a), (d), and (e) mentioned above, in the case of using a lead storage battery pack as the first power storage pack 11. In addition, changing the capacity ratio between the two power storage modules can adjust the positions of the start point of the step and of the end point of the step, and thus also adjust the ratio between the capacity on the lower SOC side of the start point of the step and the capacity on the higher SOC side of the end point of the step.

Example 16

Figure 44:
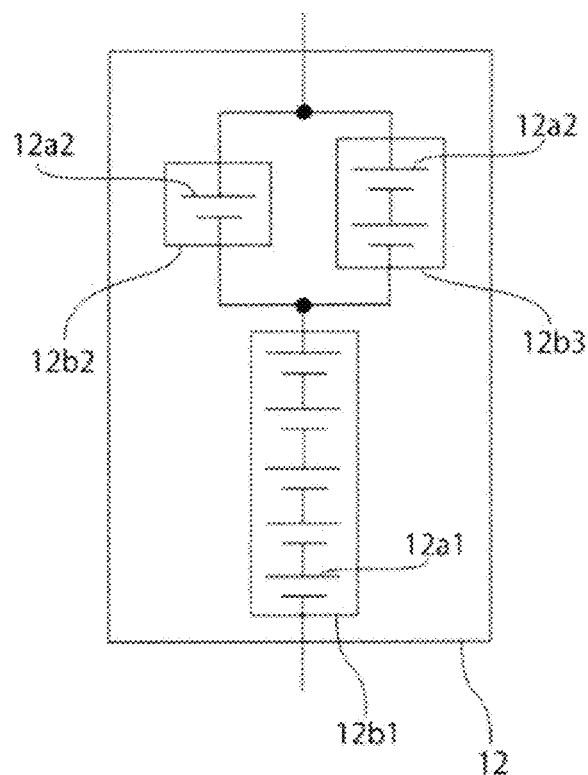
FIG. 44 is a schematic circuit diagram of a second power storage pack fabricated according to Example 16.

Lithium ion storage batteries 12*a*1 with A/C ratio=0.8 and capacity of 10 Ah were prepared with the use of LiFePO$_4$ for a positive electrode active material and the use of Li$_4$Ti$_5$O$_{12}$ for a negative electrode active material. Next, lithium ion storage batteries 12*a*2 with A/C ratio=0.8 and capacity of 5 Ah were prepared with the use of the same positive electrode active material and negative electrode active material as used for the preparation of the lithium ion storage batteries 12*a* 1. Next, as shown in FIG. 44, a second power storage pack 12 was fabricated by connecting in series a lithium ion power storage module 12*b*1 composed of series-connected five of the lithium ion storage batteries 12*a*1 and a lithium ion power storage module 12*b*2 composed of one of the lithium ion storage batteries 12*a*2, and furthermore, connecting a lithium ion power storage module 12*b*3 composed of series-connected two of the lithium ion storage batteries 12*a*2 in parallel to the lithium ion power storage module 12*b*2, and a charge/discharge curve was measured. The measured charge/discharge curve was similar to the charge/discharge curve (FIGS. 39, 40) according to Example 14.

Example 17

Figure 45:
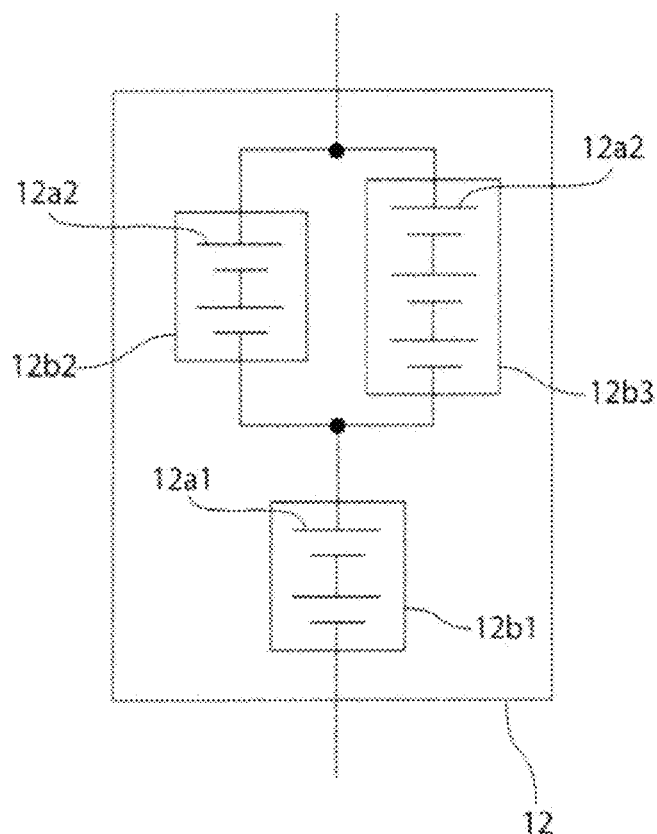
FIG. 45 is a schematic circuit diagram of a second power storage pack fabricated according to Example 17.
Figure 47:
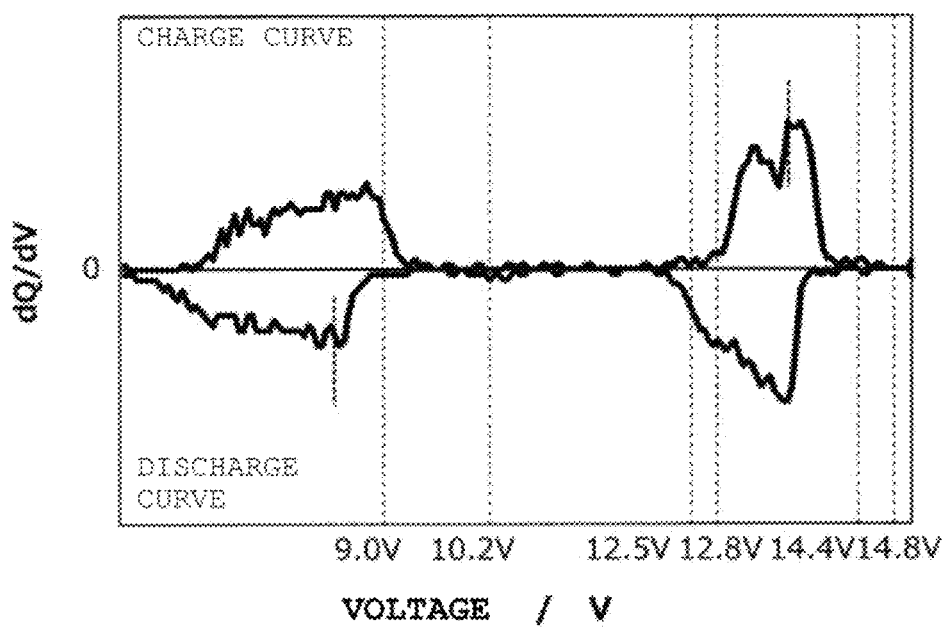
FIG. 47 is a curve (dQ/dV curve) obtained by differentiating the charge/discharge curve for the second power storage pack 12 fabricated according to Reference Example 3 with respect to voltage.

Lithium ion storage batteries 12*a*1 with A/C ratio=1.2 and capacity of 10 Ah were prepared with the use of LiFePO$_4$ as a positive electrode active material and the use of graphite as a negative electrode active material. In addition, lithium ion storage batteries 12a2 with A/C ratio=1.2 and capacity of 5 Ah were prepared with the use of $LiMn_2O_4$ as a positive electrode active material and the use of $Li_4Ti_5O_{12}$ as a negative electrode active material. Next, as shown in FIG. 47, a second power storage pack 12 was fabricated by connecting in series a lithium ion power storage module 12b1 composed of series-connected two of the lithium ion storage batteries 12a1 and a lithium ion power storage module 12b2 composed of series-connected two of the lithium ion storage batteries 12a2, and furthermore, connecting series-connected three lithium ion power storage modules 12b3 in parallel to the lithium ion power storage module 12b2, and a charge/discharge curve was measured. The measured charge/discharge curve was similar to the charge/discharge curve (FIGS. 44, 45) according to Example 15.

Reference Example 3

Figure 46:
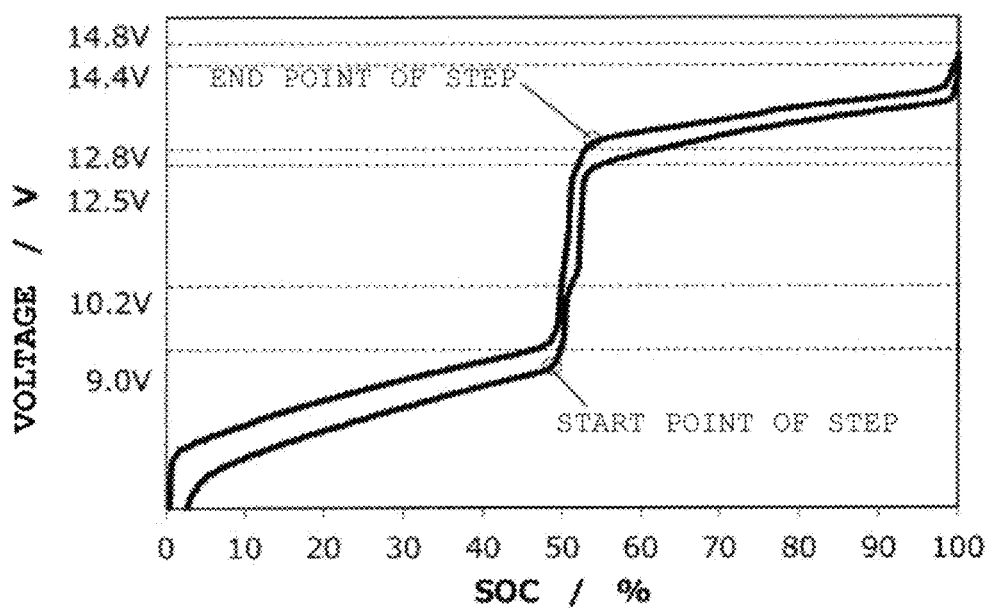
FIG. 46 is charge/discharge curve for a second power storage pack 12 fabricated according to Reference Example 3.

Lithium ion storage batteries 12a with A/C ratio=1.5 and capacity of 10 Ah were prepared with the use of, as a positive electrode active material, $LiFePO_4$ and $Li[Ni_{0.50}Mn_{1.50}]O_4$ mixed at 50:50 in ratio by weight and the use of hard carbon as a negative electrode active material. Three of the lithium ion storage batteries 12a were connected in series as shown in FIG. 6 as in Example 1, thereby fabricating a second power storage pack 12, and a charge/discharge curve was measured. FIG. 46 shows therein a charge/discharge curve for the second power storage pack 12, and FIG. 47 shows therein a dQ/dV curve therefor.

Reference Example 4

Figure 48:
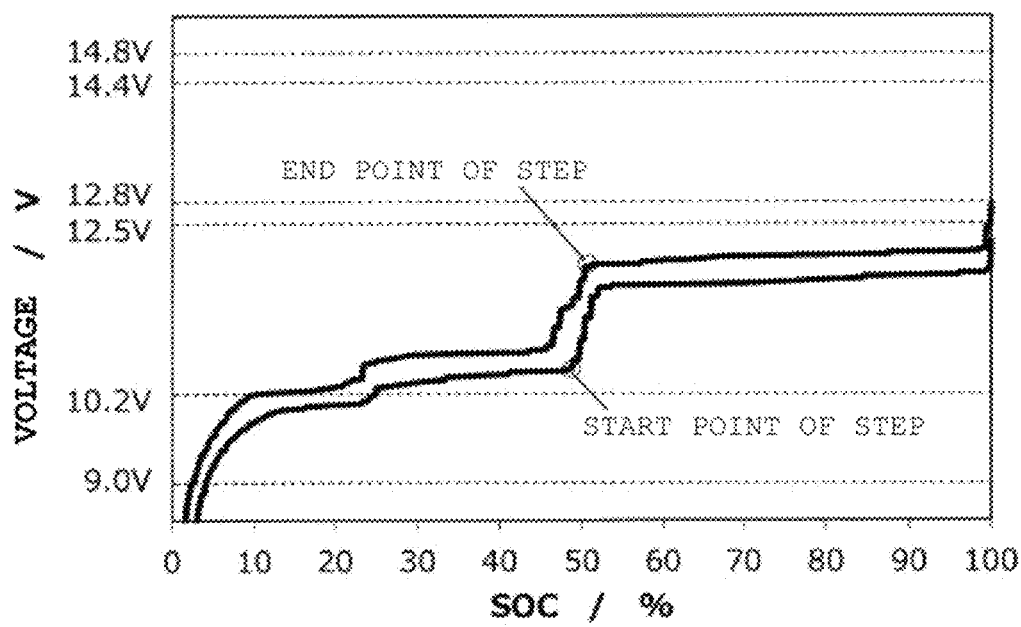
FIG. 48 is charge/discharge curve for a second power storage pack 12 fabricated according to Reference Example 4.
Figure 49:
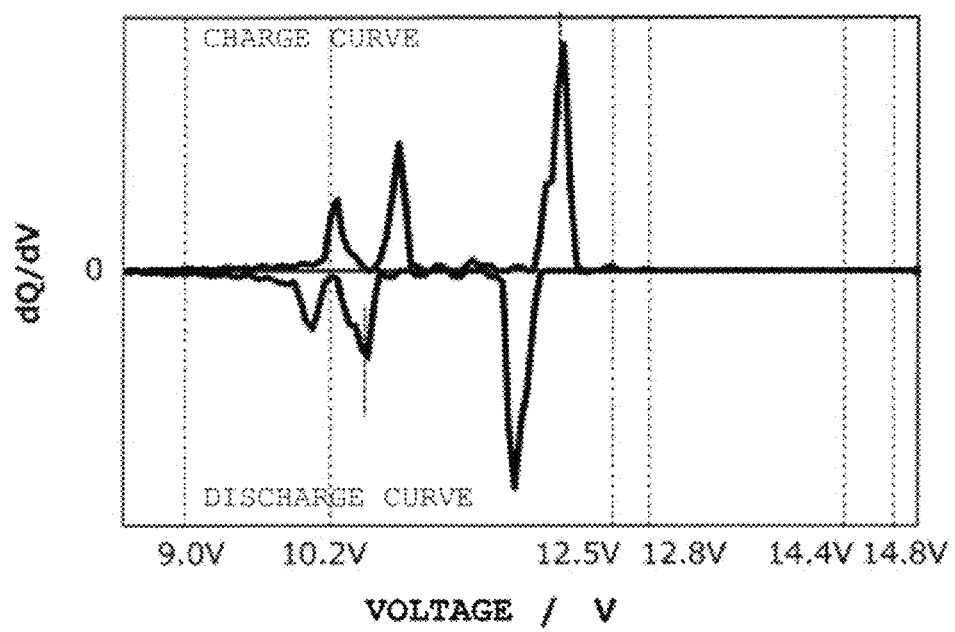
FIG. 49 is a curve (dQ/dV curve) obtained by differentiating the charge/discharge curve for the second power storage pack 12 fabricated according to Reference Example 4 with respect to voltage.

Lithium ion storage batteries 12a with A/C ratio=1.2 and capacity of 10 Ah were prepared with the use of $Li_3V_2(PO_4)_3$ as a positive electrode active material and the use of graphite as a negative electrode active material. The lithium ion storage batteries 12a were connected in series as shown in FIG. 6 as in Example 1, thereby fabricating a second power storage pack 12, and a charge/discharge curve was measured. FIG. 48 shows therein a charge/discharge curve for the second power storage pack 12, and FIG. 49 shows therein a dQ/dV curve therefor.

Reference Example 5

Figure 31:
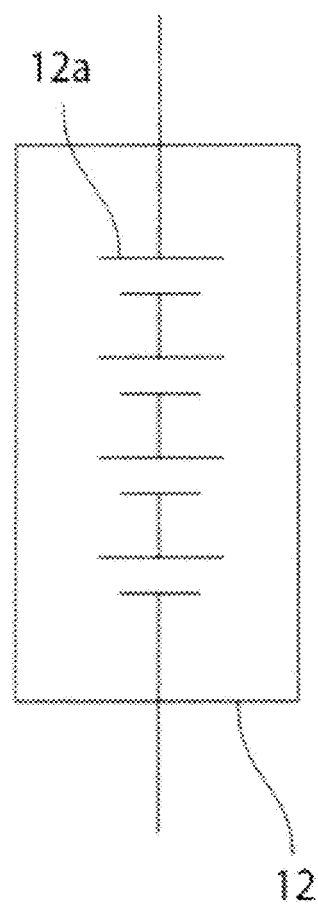
FIG. 31 is a schematic circuit diagram of a second power storage pack fabricated according to Example 11.
Figure 50:
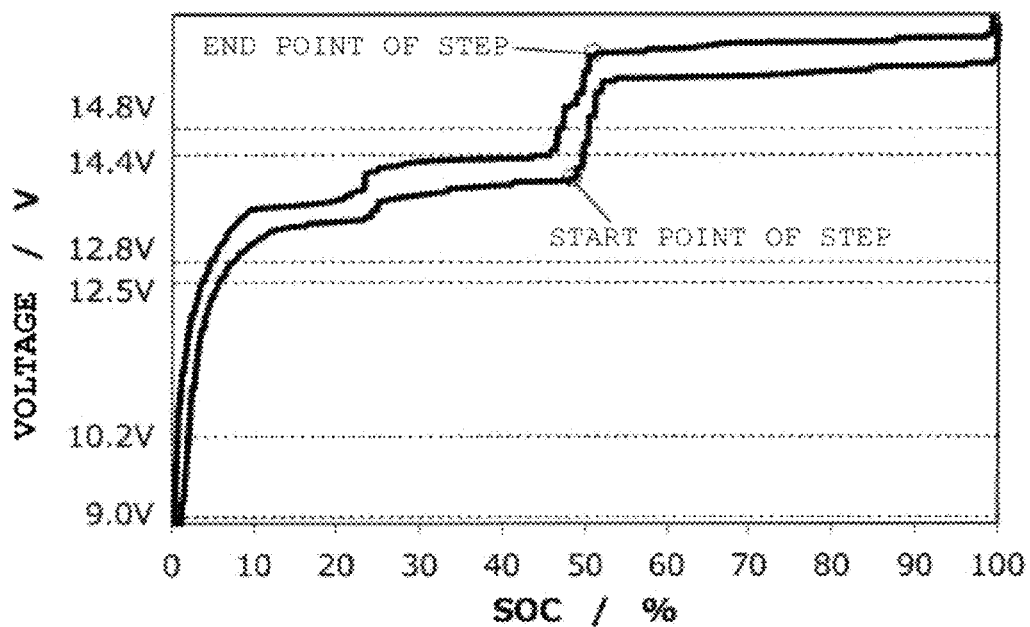
FIG. 50 is charge/discharge curve for a second power storage pack 12 fabricated according to Reference Example 5.
Figure 51:
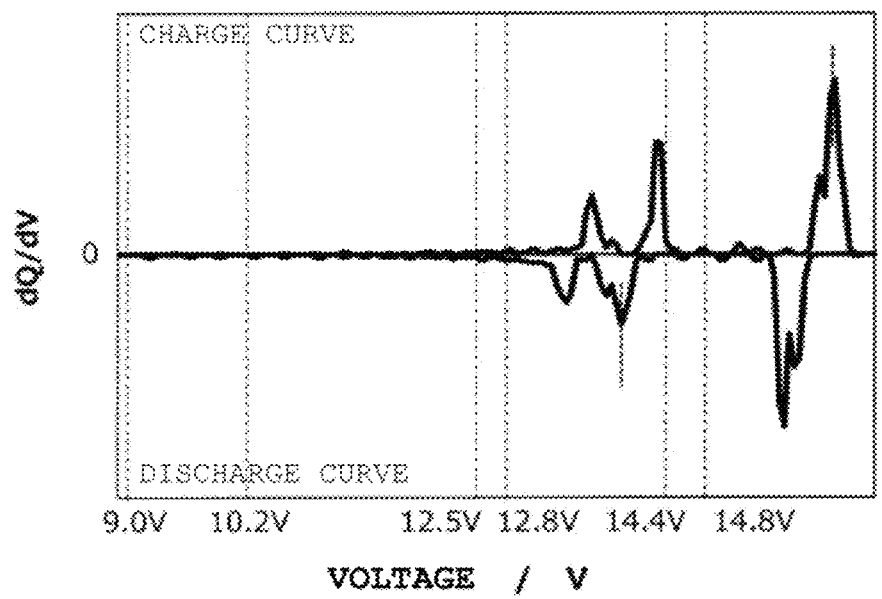
FIG. 51 is a curve (dQ/dV curve) obtained by differentiating the charge/discharge curve for the second power storage pack 12 fabricated according to Reference Example 5 with respect to voltage.

Lithium ion storage batteries 12a with A/C ratio=1.2 and capacity of 10 Ah were prepared with the use of $Li_3V_2(PO_4)_3$ as a positive electrode active material and the use of graphite as a negative electrode active material. Four of the lithium ion storage batteries 12a were connected in series as shown in FIG. 31, thereby fabricating a second power storage pack 12, and a charge/discharge curve was measured. FIG. 50 shows therein a charge/discharge curve for the second power storage pack 12, and FIG. 51 shows therein a dQ/dV curve therefor.

Reference Example 6

Figure 52:
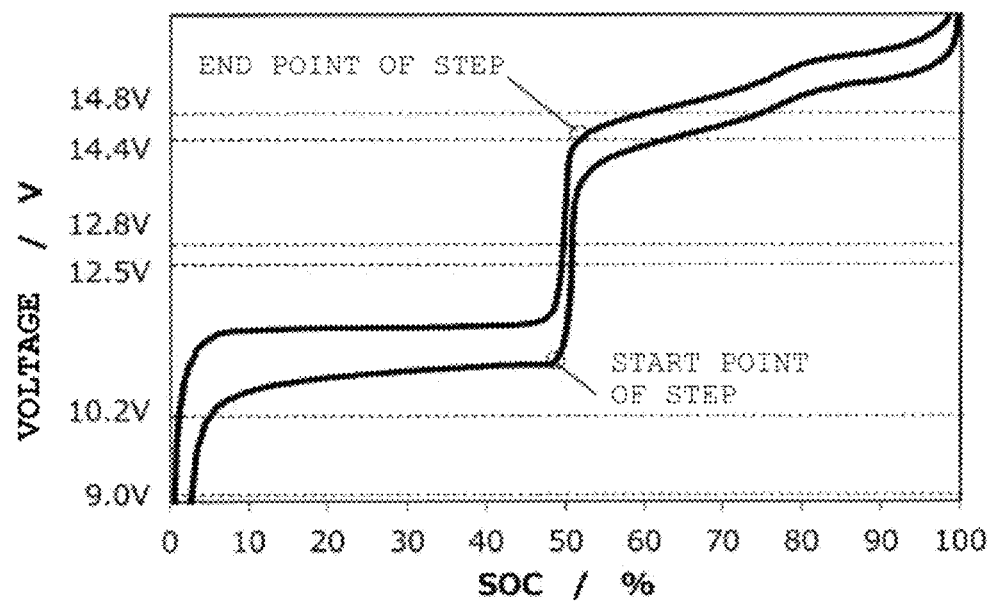
FIG. 52 is charge/discharge curve for a second power storage pack 12 fabricated according to Reference Example 6.
Figure 53:
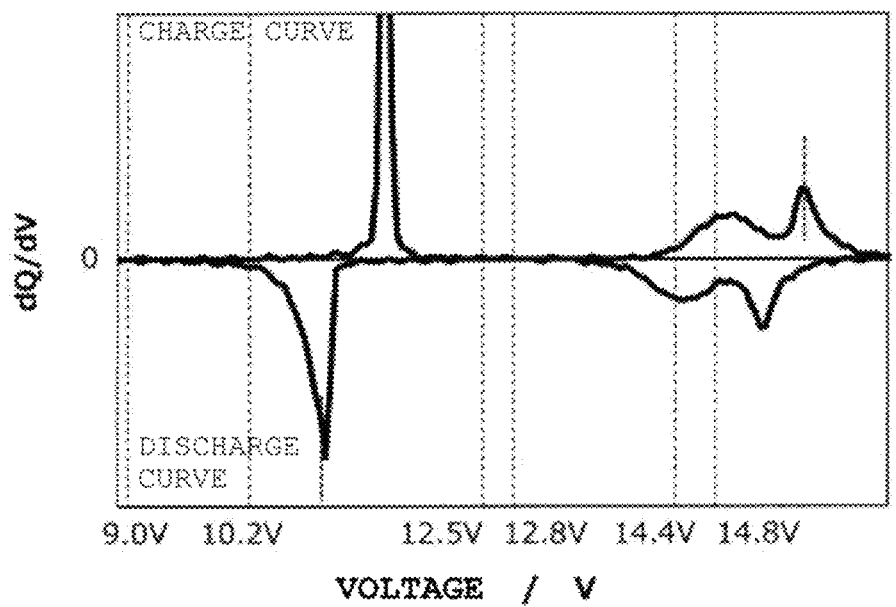
FIG. 53 is a curve (dQ/dV curve) obtained by differentiating the charge/discharge curve for the second power storage pack 12 fabricated according to Reference Example 6 with respect to voltage.

Lithium ion storage batteries 12a with A/C ratio=1.2 and capacity of 1 Ah were prepared with the use of, as a positive electrode active material, $LiFePO_4$ and $LiMn_2O_4$ mixed at 50:50 in ratio by weight and the use of $Li_4Ti_5O_{12}$ as a negative electrode active material. Six of the lithium ion storage batteries 12a were connected in series as shown in FIG. 34, thereby fabricating a second power storage pack 12, and a charge/discharge curve was measured. FIG. 52 shows therein a charge/discharge curve for the second power storage pack 12, and FIG. 53 shows therein a dQ/dV curve therefor.

Reference Example 7

Figure 54:
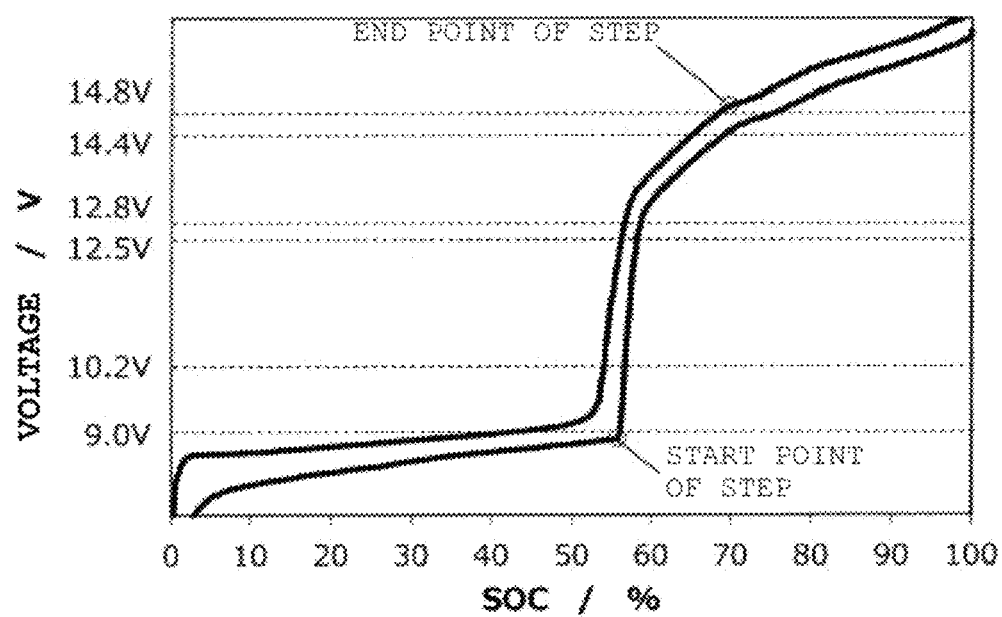
FIG. 54 is charge/discharge curve for a second power storage pack 12 fabricated according to Reference Example 7.
Figure 55:
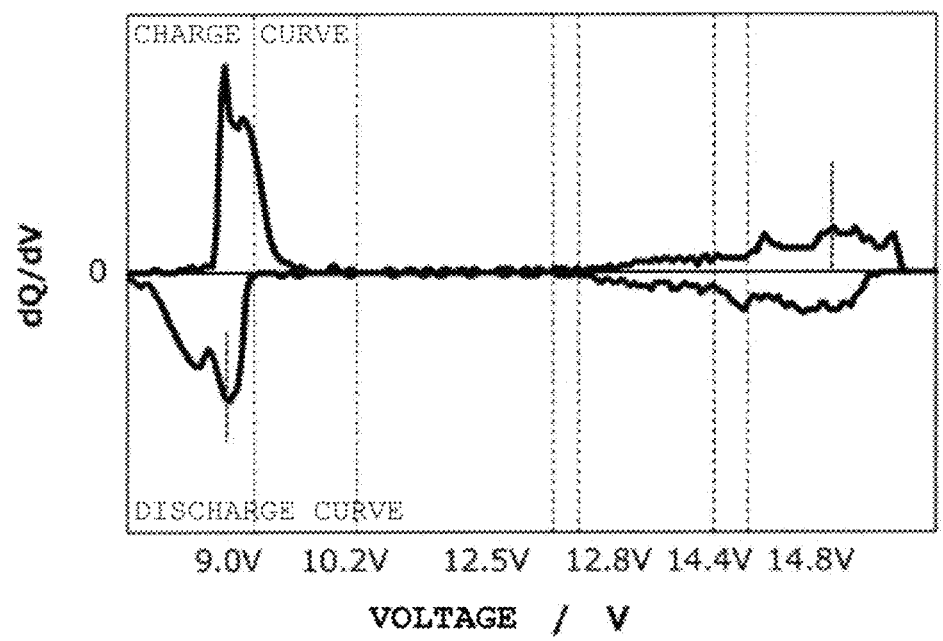
FIG. 55 is a curve (dQ/dV curve) obtained by differentiating the charge/discharge curve for the second power storage pack 12 fabricated according to Reference Example 7 with respect to voltage.

With the use of $LiNi_{1/3}Co_{1/3}Mn_{1/3}O_2$ as a positive electrode active material and the use of, as a negative electrode active material, graphite and $Li_4Ti_5O_{12}$ mixed at 40:60 in ratio by weight, the lithium ion storage batteries 12a with A/C ratio=1.2 and capacity of 1 Ah were connected as shown in FIG. 31, thereby fabricating a second power storage pack 12, and a charge/discharge curve was measured. FIG. 54 shows therein a charge/discharge curve for the second power storage pack 12, and FIG. 55 shows therein a dQ/dV curve therefor. The lithium ion storage batteries 12a were prepared.

Example 18

Figure 56:
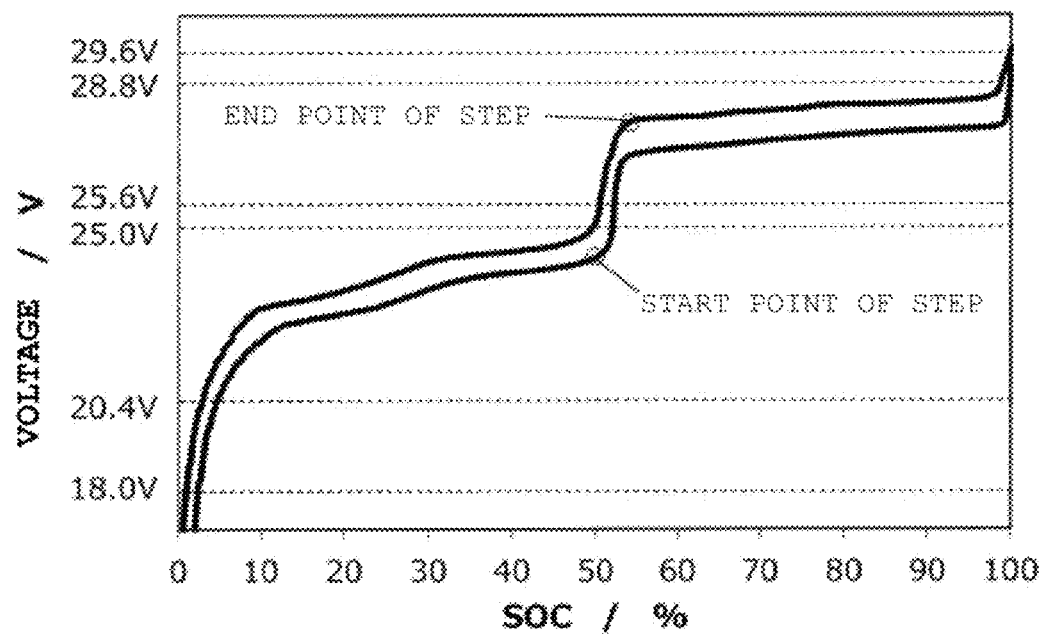
FIG. 56 is a charge/discharge curve for a second power storage pack 12 fabricated according to Example 18.
Figure 57:
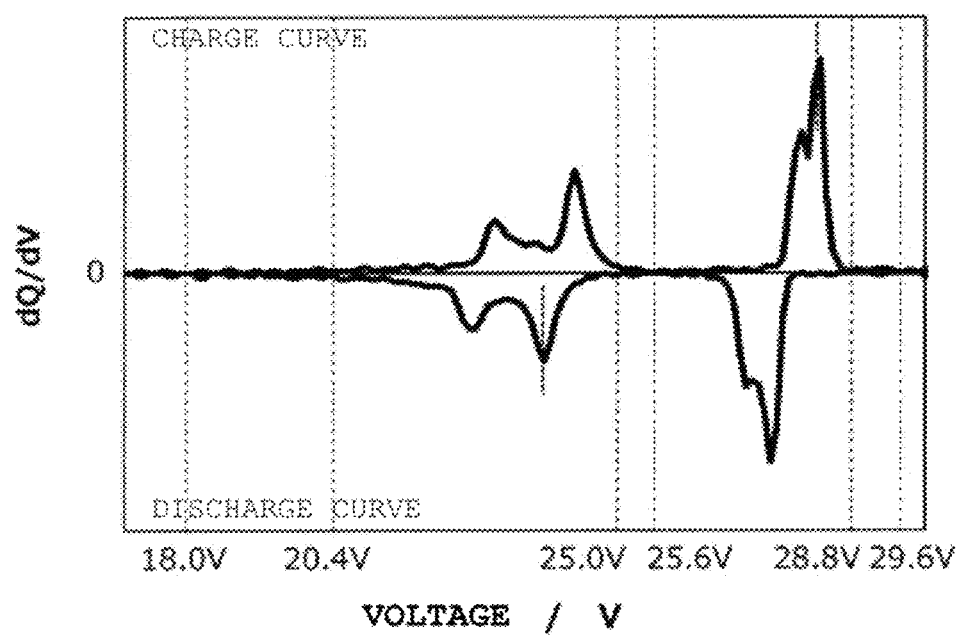
FIG. 57 is a curve (dQ/dV curve) obtained by differentiating the charge/discharge curve for the second power storage pack 12 fabricated according to Example 18 with respect to voltage.

Lithium ion storage batteries 12a with A/C ratio=1.2 and capacity of 10 Ah were prepared with the use of $Li[Ni_{0.25}Mn_{1.75}]O_4$ as a positive electrode active material and the use of graphite as a negative electrode active material. Six of the lithium ion storage batteries 12a were connected in series as shown in FIG. 34, thereby fabricating a second power storage pack 12, and a charge/discharge curve was measured. FIG. 56 shows therein a charge/discharge curve for the second power storage pack 12, and FIG. 57 shows therein a dQ/dV curve therefor.

Example 19

Figure 58:
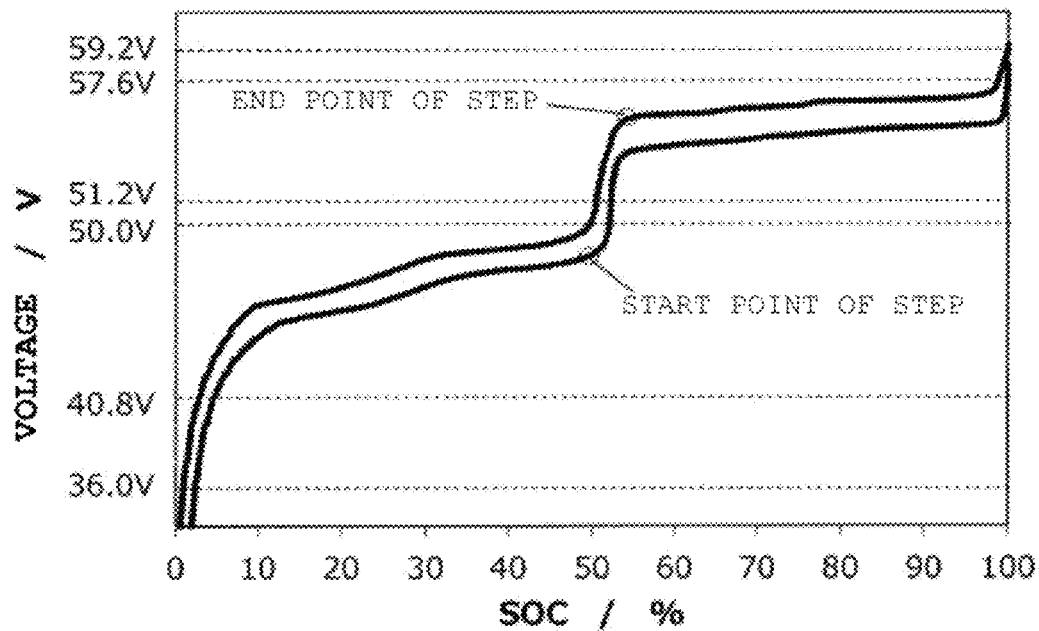
FIG. 58 is a charge/discharge curve for a second power storage pack 12 fabricated according to Example 19.
Figure 59:
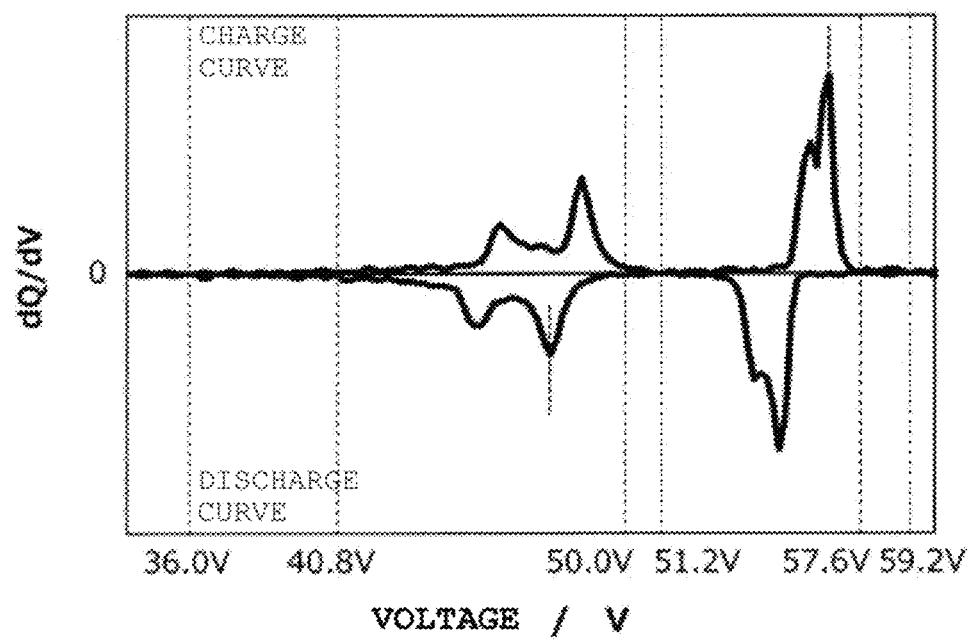
FIG. 59 is a curve (dQ/dV curve) obtained by differentiating the charge/discharge curve for the second power storage pack 12 fabricated according to Example 19 with respect to voltage.

Lithium ion storage batteries 12a with A/C ratio=1.2 and capacity of 20 Ah were prepared with the use of $Li[Ni_{0.25}Mn_{1.75}]O_4$ as a positive electrode active material and the use of graphite as a negative electrode active material. Twelve of the lithium ion storage batteries 12a were connected in series, thereby fabricating a second power storage pack 12, and a charge/discharge curve was measured. FIG. 58 shows therein a charge/discharge curve for the second power storage pack 12, and FIG. 59 shows therein a dQ/dV curve therefor.

Example 20

Figure 60:
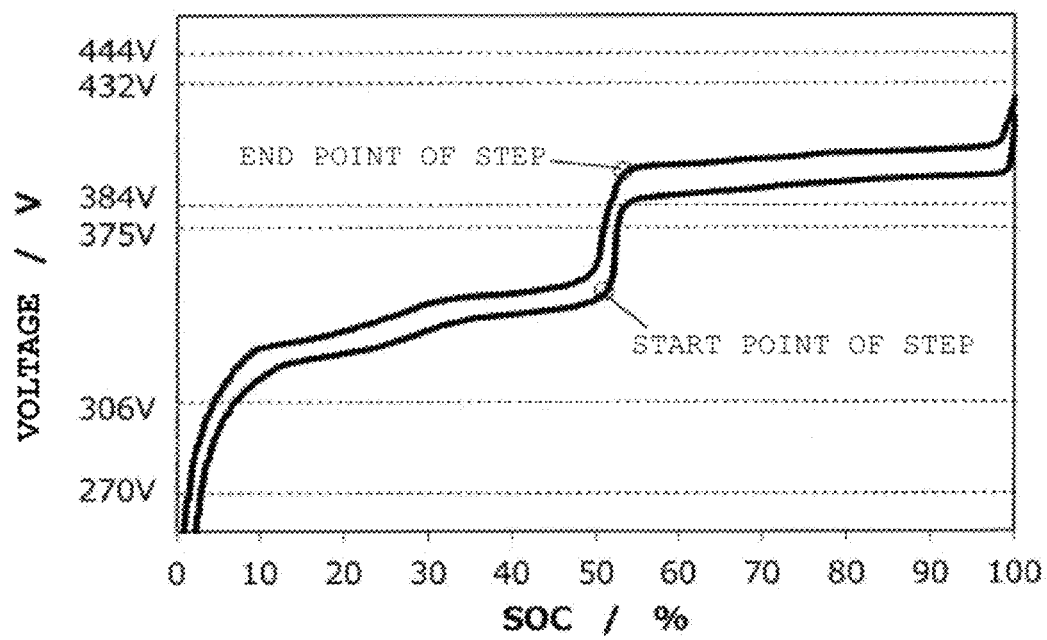
FIG. 60 is a charge/discharge curve for a second power storage pack 12 fabricated according to Example 20.
Figure 61:
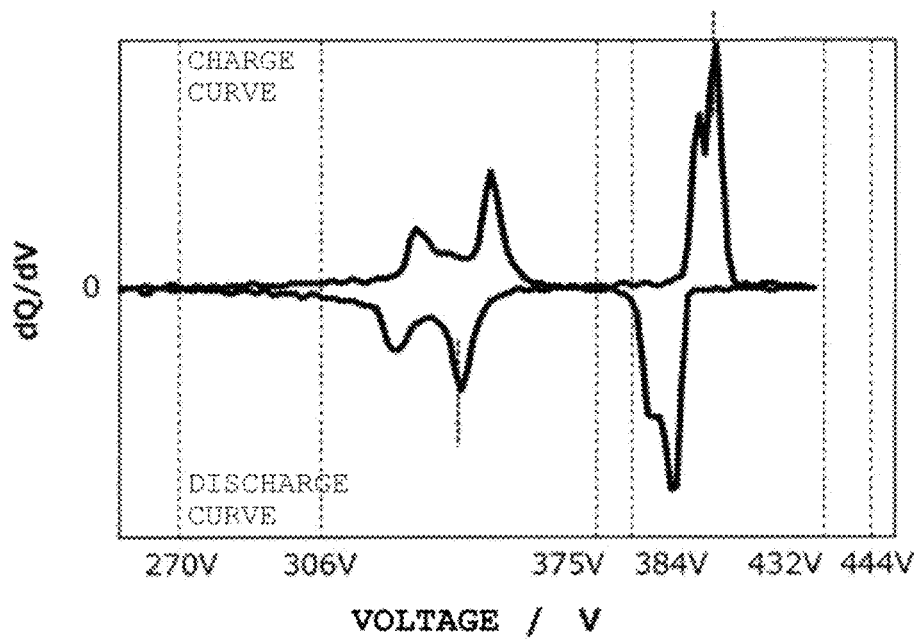
FIG. 61 is a curve (dQ/dV curve) obtained by differentiating the charge/discharge curve for the second power storage pack 12 fabricated according to Example 20 with respect to voltage.
Figure 62:
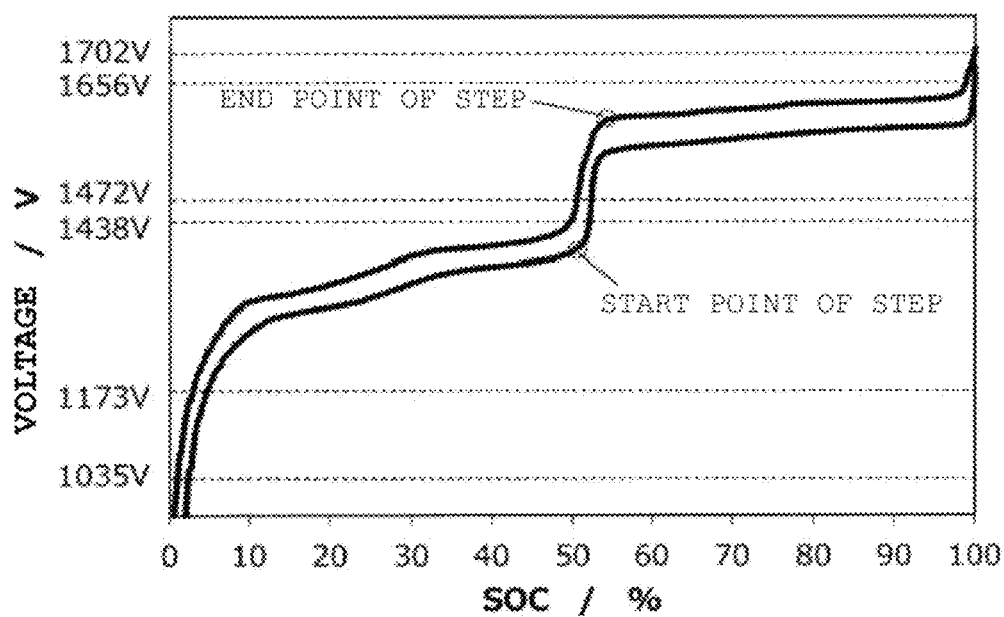
FIG. 62 is a charge/discharge curve for a second power storage pack 12 fabricated according to Example 21.

Lithium ion storage batteries 12a with A/C ratio=1.2 and capacity of 50 Ah were prepared with the use of $Li[N_{0.25}Mn_{1.75}]O_4$ as a positive electrode active material and the use of graphite as a negative electrode active material. Ninety of the lithium ion storage batteries 12a were connected in series, thereby fabricating a second power storage pack 12, and a charge/discharge curve was measured. FIG. 60 shows therein a charge/discharge curve for the second power storage pack 12, and FIG. 61 shows therein a dQ/dV curve therefor.

Example 21

Figure 63:
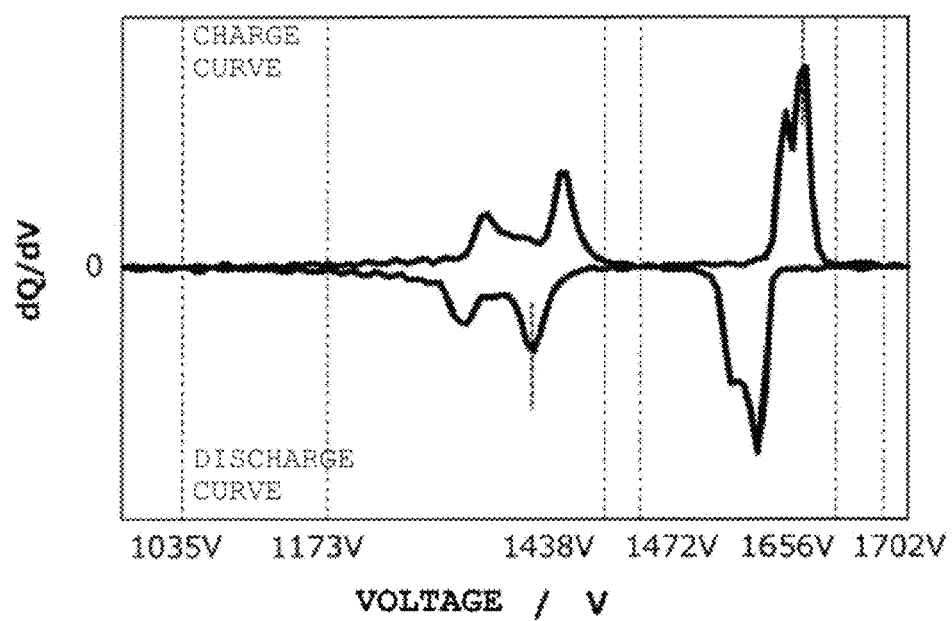
FIG. 63 is a curve (dQ/dV curve) obtained by differentiating the charge/discharge curve for the second power storage pack 12 fabricated according to Example 21 with respect to voltage.

Lithium ion storage batteries 12a with A/C ratio=1.2 and capacity of 50 Ah were prepared with the use of $Li[Ni_{0.25}Mn_{1.75}]O_4$ as a positive electrode active material and the use of graphite as a negative electrode active material. Three hundred and forty five of the lithium ion charge/discharge curve for the second power storage pack 12, and FIG. 63 shows therein a dQ/dV curve therefor.

TABLE 1

| | | Configuration of Power Storage Module or Unit Cell | | | | | |
|---|---|---|---|---|---|---|---|
| | | Positive Electrode Active Material | Negative Electrode Active Material | A/C ration | Capacity (Ah) | Number of Series Connections | n |
| | Example 1 | Li[Ni$_{0.25}$Mn$_{1.75}$]O$_4$ | Graphite | 1.2 | 1 | 3 | 1 |
| | Example 2 | Li[Ni$_{0.05}$Mn$_{1.95}$]O$_4$ | Graphite | 1.2 | 1 | 3 | 1 |
| | Example 3 | Li[Ni$_{0.15}$Mn$_{1.85}$]O$_4$ | Graphite | 1.2 | 1 | 3 | 1 |
| | Example 4 | Li[Ni$_{0.35}$Mn$_{1.65}$]O$_4$ | Graphite | 1.2 | 1 | 3 | 1 |
| | Example 5 | Li[Ni$_{0.45}$Mn$_{1.55}$]O$_4$ | Graphite | 1.2 | 1 | 3 | 1 |
| | Reference Example 1 | LiMn$_2$O$_4$ | Graphite | 1.2 | 1 | 3 | 1 |
| | Reference Example 2 | Li[Ni$_{0.50}$Mn$_{1.50}$]O$_4$ | Graphite | 1.2 | 1 | 3 | 1 |
| | Example 6 | Li[Ni$_{0.25}$Mn$_{1.75}$]O$_4$ | Hard Carbon | 1.2 | 1 | 3 | 1 |
| | Example 7 | Li[Ni$_{0.25}$Mn$_{1.75}$]O$_4$ | Soft Carbon | 1.2 | 1 | 3 | 1 |
| | Example 8 | Li[Ni$_{0.25}$Mn$_{1.75}$]O$_4$ | Si | 2.0 | 1 | 3 | 1 |
| | Example 9 | Li[Ni$_{0.25}$Mn$_{1.75}$]O$_4$ | SnO$_2$ | 1.5 | 1 | 3 | 1 |
| | Example 10 | LiMn$_2$O$_4$:Li[Ni$_{0.50}$Mn$_{1.50}$]O$_4$ = 40:60(Weight) | Graphite | 1.2 | 1 | 3 | 1 |
| | Example 11 | LiFePO$_4$:LiNi$_{1/3}$Co$_{1/3}$Mn$_{1/3}$O$_2$ = 35:65(Weight) | Si | 3.0 | 1 | 4 | 1 |
| | Example 12 | LiFePO$_4$:LiNi$_{1/3}$Co$_{1/3}$Mn$_{1/3}$O$_2$ = 50:50(Weight) | Li$_4$Ti$_5$O$_{12}$ | 1.2 | 1 | 6 | 1 |
| Example 13 | Power Storage Module 12b1 | LiMn$_2$O$_4$ | Graphite | 1.2 | 0.4 | 3 | 1 |
| | Power Storage Module 12b2 | Li[Ni$_{0.50}$Mn$_{1.50}$]O$_4$ | Graphite | 1.2 | 0.6 | 3 | 1 |
| Example 14 | Power Storage Module 12b1 | LiNi$_{1/3}$Co$_{1/3}$Mn$_{1/3}$O$_2$ | Li$_4$Ti$_5$O$_{12}$ | 0.8 | 0.5 | 5 | 1 |
| | Power Storage Module 12b2 | LiNi$_{1/3}$Co$_{1/3}$Mn$_{1/3}$O$_2$ | Li$_4$Ti$_5$O$_{12}$ | 0.8 | 0.5 | 6 | 1 |
| Example 15 | Lithium Ion Storage Battery 12a1 | LiFePO$_4$ | Graphite | 1.2 | 0.5 | — | 1 |
| | Lithium Ion Storage Battery 12a2 | LiMn$_2$O$_4$ | Li$_4$Ti$_5$O$_{12}$ | 1.2 | 0.5 | — | |
| Example 16 | Lithium Ion Storage Battery 12a1 | LiNi$_{1/3}$Co$_{1/3}$Mn$_{1/3}$O$_2$ | Li$_4$Ti$_5$O$_{12}$ | 0.8 | 1 | — | 1 |
| | Lithium Ion Storage Battery 12a2 | LiNi$_{1/3}$Co$_{1/3}$Mn$_{1/3}$O$_2$ | Li$_4$Ti$_5$O$_{12}$ | 0.8 | 0.5 | — | |
| Example 17 | Lithium Ion Storage Battery 12a1 | LiFePO$_4$ | Graphite | 1.2 | 1 | — | 1 |
| | Lithium Ion Storage Battery 12a2 | LiMn$_2$O$_4$ | Li$_4$Ti$_5$O$_{12}$ | 1.2 | 0.5 | — | |
| | Reference Example 3 | LiFePO$_4$:LiNi$_{0.50}$Co$_{1/3}$Mn$_{1.5}$O$_4$ = 50:50(Weight) | Hard Carbon | 1.5 | 1 | 3 | 1 |
| | Reference Example 4 | Li$_3$V$_2$(PO$_4$)$_3$ | Graphite | 1.2 | 1 | 3 | 1 |
| | Reference Example 5 | Li$_3$V$_2$(PO$_4$)$_3$ | Graphite | 1.2 | 1 | 4 | 1 |
| | Reference Example 6 | LiFePO$_4$:LiMn$_2$O$_4$ = 50:50(Weight) | Li$_4$Ti$_5$O$_{12}$ | 1.2 | 1 | 6 | 1 |
| | Reference Example 7 | LiNi$_{1/3}$Co$_{1/3}$Mn$_{1/3}$O$_2$ | Graphite: Li$_4$Ti$_5$O$_{12}$ = 40:60(Ratio by Weight) | 1.2 | 1 | 4 | 1 |
| | Example 18 | Li[Ni$_{0.25}$Mn$_{1.75}$]O$_4$ | Graphite | 1.2 | 10 | 6 | 2 |
| | Example 19 | Li[Ni$_{0.25}$Mn$_{1.75}$]O$_4$ | Graphite | 1.2 | 20 | 12 | 4 |
| | Example 20 | Li[Ni$_{0.25}$Mn$_{1.75}$]O$_4$ | Graphite | 1.2 | 50 | 90 | 30 |
| | Example 21 | Li[Ni$_{0.25}$Mn$_{1.75}$]O$_4$ | Graphite | 1.2 | 50 | 345 | 115 |

TABLE 2

| | | Start Point of Step | | End Point of Step | | Lower SOC Side of Start Point of Step | | Higher SOC Side of End Point of Step | | Capacity Ratio | |
|---|---|---|---|---|---|---|---|---|---|---|---|
| | | | | | | Average | Voltage at Peak Top of | Average | Voltage at Peak Top of | Lower SOC Side | Higher SOC Side |
| | | SOC (%) | Voltage (V) | SOC (%) | Voltage (V) | Discharge Voltage (V) | dQ/dV Curve (V) | Charge Voltage (V) | dQ/dV Curve (V) | of Start Point of Step | of End Point of Step |
| | Example 1 | 50 | 12.1 | 53 | 13.8 | 11.2 | 11.9 | 14.1 | 14.2 | 52 | 48 |
| | Example 2 | 85 | 12.2 | 89 | 14.0 | 11.4 | 11.9 | 14.1 | 14.1 | 89 | 11 |
| | Example 3 | 70 | 12.2 | 72 | 13.9 | 11.3 | 11.9 | 14.1 | 14.1 | 72 | 28 |
| | Example 4 | 32 | 12.0 | 35 | 13.8 | 10.9 | 11.7 | 14.1 | 14.2 | 33 | 67 |
| | Example 5 | 13 | 11.8 | 16 | 13.6 | 10.3 | 11.7 | 14.1 | 14.2 | 14 | 86 |
| | Reference Example 1 | | | | | No step in the SOC range of 5 to 95% | | | | | |
| | Reference Example 2 | | | | | No step in the SOC range of 5 to 95% | | | | | |
| | Example 6 | 48 | 11.2 | 54 | 13.2 | 9.6 | 10.9 | 13.8 | 14.0 | 51 | 49 |
| | Example 7 | 48 | 11.3 | 54 | 13.3 | 9.7 | 11.0 | 13.8 | 14.0 | 51 | 49 |
| | Example 8 | 50 | 11.2 | 54 | 13.4 | 10.2 | 10.9 | 13.6 | 13.5 | 52 | 48 |
| | Example 9 | 50 | 10.8 | 53 | 13.1 | 9.8 | 12.4 | 13.5 | 13.3 | 52 | 48 |
| | Example 10 | 41 | 12.1 | 44 | 13.8 | 11.1 | 11.9 | 14.1 | 14.2 | 42 | 58 |
| | Example 11 | 34 | 11.4 | 36 | 13.5 | 10.6 | 11.3 | 14.4 | 13.7 | 35 | 65 |
| | Example 12 | 49 | 11.0 | 50 | 13.0 | 10.4 | 11.0 | 14.0 | 13.1 | 49 | 51 |
| Example 13 | Power Storage Module 12b1 Power Storage Module 12b2 | 41 | 12.1 | 44 | 13.8 | 11.1 | 11.9 | 14.1 | 14.2 | 42 | 58 |
| Example 14 | Power Storage Module 12b1 Power Storage Module 12b2 | 48 | 11.5 | 52 | 12.9 | 10.6 | 10.9 | 13.8 | 13.0 | 50 | 50 |
| Example 15 | Lithium Ion Storage Battery 12a1 Lithium Ion Storage Battery 12a2 | 50 | 11.9 | 54 | 13.8 | 11.1 | 11.7 | 14.5 | 14.7 | 52 | 48 |
| Example 16 | Lithium Ion Storage Battery 12a1 Lithium Ion Storage Battery 12a2 | 48 | 11.5 | 52 | 12.9 | 10.6 | 10.9 | 13.8 | 13.0 | 50 | 50 |
| Example 17 | Lithium Ion Storage Battery 12a1 Lithium Ion Storage Battery 12a2 | 50 | 11.9 | 54 | 13.8 | 11.1 | 11.7 | 14.5 | 14.7 | 52 | 48 |
| | Reference Example 3 | 48 | 8.6 | 54 | 13.0 | 7.4 | 8.5 | 13.5 | 13.8 | 51 | 49 |
| | Reference Example 4 | 48 | 10.5 | 51 | 11.9 | 9.9 | 11.7 | 12.1 | 12.1 | 50 | 50 |
| | Reference Example 5 | 48 | 14.1 | 51 | 15.9 | 13.2 | 14.3 | 16.1 | 15.6 | 50 | 50 |
| | Reference Example 6 | 49 | 11.0 | 53 | 14.5 | 10.4 | 11.0 | 15.4 | 15.7 | 51 | 49 |
| | Reference Example 7 | 56 | 9.0 | 70 | 14.9 | 8.3 | 8.7 | 15.8 | 15.8 | 65 | 35 |
| | Example 18 | 50 | 24.2 | 53 | 27.7 | 22.4 | 23.8 | 28.2 | 28.3 | 52 | 48 |
| | Example 19 | 30 | 48.5 | 53 | 55.3 | 44.7 | 47.6 | 56.3 | 56.6 | 52 | 48 |
| | Example 20 | 50 | 363.7 | 53 | 415.1 | 335.6 | 357.0 | 422.6 | 424.5 | 52 | 48 |
| | Example 21 | 50 | 1394 | 53 | 1591 | 1287 | 1369 | 1620 | 1627 | 52 | 48 |

DESCRIPTION OF REFERENCE SYMBOLS

1: power storage system
2: vehicle
11: first power storage pack
12: second power storage pack
13: electric load
14: recharger

The invention claimed is:

1. A power storage pack comprising:
a first power storage pack; and
a second power storage pack with a different chemistry from the first power storage pack and connected in parallel to the first power storage pack without any DC-DC converter interposed therebetween, wherein:
a charge/discharge curve of the first power storage pack measured with a constant C-rate has a step passing through a range of (12.5×n) V to (12.8×n) V,
on a lower SOC side of a start point of the step of the charge/discharge curve of the first power storage pack, an average discharge voltage falls within a range of (9.0×n) V to (12.5×n) V and/or a voltage at a peak top obtained on a dQ/dV curve obtained by differentiating the discharge curve with respect to voltage falls within a range of (9.0×n) V to (12.5×n) V,
on a higher SOC side of an end point of the step of the charge/discharge curve of the first power storage pack, an average charge voltage falls within the range of (12.8×n) V to (14.8×n) V and/or a voltage at a peak top obtained on a dQ/dV curve obtained by differentiating the charge curve with respect to voltage falls within the range of (12.8×n) V to (14.8×n) V,
wherein a step of a charge or discharge curve refers to a range in which a proportion of an amount of change in voltage, ΔV, on the charge/discharge curve to an amount of change in SOC, ΔSOC, is (100×n) mV/% or more when the SOC is in the range of 5% to 95%,
wherein the start point of the step is a minimum voltage of the discharge curve in a range of one step, and a corresponding value of the SOC at the minimum voltage, the end point of the step is a maximum voltage of the charge curve in a range of that one step, and a corresponding value of the SOC at the maximum voltage, and n is a natural number of 1 to 125.

2. The power storage pack according to claim 1, wherein the first power storage pack comprises a power storage device, and the power storage device is a lithium ion storage battery or a nickel-metal-hydride storage battery.

3. The power storage pack according to claim 2, wherein the power storage device is a lithium ion storage battery having a positive electrode, and a positive electrode active material of the positive electrode is at least one material selected from $Li[Ni_xMn_{(2-x)}]O_4$ ($0.05 \leq x \leq 0.45$), $Li[Co_xMn_{(2-x)}]O_4$ ($0.1 \leq x \leq 1$), $Li[Fe_xMn_{(2-x)}]O_4$ ($0.05 \leq x \leq 0.45$), $LiFe_aMn_bCo_cNi_dPO_4$ ($0 \leq a \leq 1$, $0 \leq b \leq 1$, $0 \leq c \leq 1$, $0 \leq d \leq 1$, $a+b+c+d=1$), and $Li_3V_2(PO_4)_3$.

4. The power storage pack according to claim 3, wherein the positive electrode active material of the positive electrode comprises multiple types of positive electrode active materials.

5. The power storage pack according to claim 2, wherein the power storage device is a lithium ion storage battery having a negative electrode, and the negative electrode comprises multiple types of negative electrode active materials.

6. The power storage pack according to claim 1, wherein the first power storage pack has a plurality of power storage modules connected in parallel, the plurality of power storage modules each comprising a plurality of power storage devices connected in series, and
the plurality of power storage modules differ from each other in number of connection stages.

7. The power storage pack according to claim 1, wherein the first power storage pack comprises multiple types of power storage modules, each of the multiple types of power storage modules comprising different types of power storage devices.

8. The power storage pack according to claim 1, wherein a ratio of a first capacity on the lower SOC side of the start point of the step of the charge/discharge curve and a second capacity on the higher SOC side of the end point of the step of the charge/discharge curve falls within a range of 10:90 to 90:10.

* * * * *